United States Patent
Tenenboym et al.

(10) Patent No.: US 10,715,334 B2
(45) Date of Patent: Jul. 14, 2020

(54) METHODS AND APPARATUS FOR VALIDATING A DIGITAL SIGNATURE

(71) Applicant: ADOBE INC.

(72) Inventors: Isak Tenenboym, San Jose, CA (US); Marc T. Kaufman, Woodside, CA (US); Philip Levy, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 86 days.

(21) Appl. No.: 15/666,868

(22) Filed: Aug. 2, 2017

(65) Prior Publication Data

US 2017/0359183 A1 Dec. 14, 2017

Related U.S. Application Data

(63) Continuation of application No. 12/474,023, filed on May 28, 2009, now Pat. No. 9,768,965.

(51) Int. Cl.
*H04L 9/32* (2006.01)
*G06F 21/64* (2013.01)
*G06F 21/78* (2013.01)

(52) U.S. Cl.
CPC ............ *H04L 9/3247* (2013.01); *G06F 21/64* (2013.01); *G06F 21/78* (2013.01); *H04L 9/321* (2013.01); *H04L 9/3265* (2013.01); *H04L 9/3268* (2013.01); *G06F 2221/2145* (2013.01)

(58) Field of Classification Search
CPC ....... H04L 9/32; H04L 9/3247; H04L 9/3263; H04L 9/3268; G06F 21/64
See application file for complete search history.

(56) References Cited

U.S. PATENT DOCUMENTS

| | | | | |
|---|---|---|---|---|
| 551,121 A | | 12/1895 | Hill | |
| 5,016,274 A | * | 5/1991 | Micali | G06Q 20/341 235/379 |
| 5,511,121 A | * | 4/1996 | Yacobi | G06Q 20/02 380/30 |
| 5,666,416 A | * | 9/1997 | Micali | G06Q 20/02 380/286 |

(Continued)

FOREIGN PATENT DOCUMENTS

| | | | | |
|---|---|---|---|---|
| EP | 0892521 A2 | * | 1/1999 | ............ H04L 63/04 |
| EP | 892521 A2 | | 1/1999 | |

(Continued)

OTHER PUBLICATIONS

"Document management—Portable document format—Part 1: PDF 1.7", PDF 32000-1:2008, First Edition. Adobe Systems Incorporated, 2008. 756 pgs. (Year: 2008).*

(Continued)

*Primary Examiner* — Zachary A. Davis
(74) *Attorney, Agent, or Firm* — Shook, Hardy & Bacon L.L.P.

(57) ABSTRACT

Various embodiments include one or more of systems, methods, software, and data structures for validating a digital signature, wherein common information in a certification chain is maintained in one entry of a Document Secure Store (DSS). The DSS separates the Long Term Validation (LTV) information from the digital signature, allowing amendment of and addition to the LTV information in the DSS after a digital signature is applied to a document.

13 Claims, 17 Drawing Sheets

(56) References Cited

U.S. PATENT DOCUMENTS

| | | | | |
|---|---|---|---|---|
| 6,487,658 | B1* | 11/2002 | Micali | G06Q 20/02 |
| | | | | 713/158 |
| 6,584,565 | B1* | 6/2003 | Zamek | H04L 63/04 |
| | | | | 713/156 |
| 6,671,805 | B1* | 12/2003 | Brown | H04L 9/3247 |
| | | | | 713/170 |
| 7,107,456 | B2* | 9/2006 | Baldwin | H04L 9/321 |
| | | | | 713/155 |
| 7,236,271 | B2* | 6/2007 | Silverbrook | B41J 2/01 |
| | | | | 347/109 |
| 7,814,074 | B2* | 10/2010 | Anglin | G06F 17/30162 |
| | | | | 707/640 |
| 7,984,302 | B2* | 7/2011 | Fukasawa | H04L 9/3247 |
| | | | | 713/177 |
| 8,132,013 | B2* | 3/2012 | Meier | G06F 21/64 |
| | | | | 705/57 |
| 8,176,015 | B1* | 5/2012 | Somerville | G06F 17/30159 |
| | | | | 707/661 |
| 8,468,339 | B2* | 6/2013 | Parkinson | H04L 9/3236 |
| | | | | 380/30 |
| 9,768,965 | B2* | 9/2017 | Tenenboym | H04L 9/3247 |
| 2007/0274293 | A1* | 11/2007 | Forbes | H04L 63/08 |
| | | | | 370/352 |

FOREIGN PATENT DOCUMENTS

| | | | | |
|---|---|---|---|---|
| GB | 2378865 | A * | 2/2003 | H04L 9/321 |
| GB | 2378865 | A | 2/2003 | |

OTHER PUBLICATIONS

Pinkas et al. "CMS Advanced Electronic Signatures (CAdES)", Request for Comments 5126. Feb. 2008. 142 pgs. (Year: 2008).*

"Electronic Signatures and Infrastructures (ESI); PDF Advanced Electronic Signature Profiles; Part 4: PAdES Long Term—PAdES-LTV Profile", ETSI TS 102 778-4, version 1.1.1. Jul. 2009. 19 pgs. (Year: 2009).*

"Document management—Portable document format—Part 1: PDF 1.7", PDF 32000-1:2008, First Edition. Adobe Systems Incorporated, 2008. 756 pgs.

Pinkas et al. "CMS Advanced Electronic Signatures (CAdES)", Request for Comments 5126. Feb. 2008. 142 pgs.

"Electronic Signatures and Infrastructures (ESI); PDF Advanced Electronic Signature Profiles; Part 4: PAdES Long Term—PAdES-LTV Profile", ETSI TS 102 778-4, version 1.1.1 Jul. 2009. 19 pgs.

Non-Final Office Action dated Sep. 24, 2015 in U.S. Appl. No. 12/474,023, 25 pages.

Final Office Action dated Apr. 24, 2015 in U.S. Appl. No. 12/474,023, 23 pages.

Non-Final Office Action dated Sep. 12, 2014 in U.S. Appl. No. 12/474,023, 17 pages.

Final Office Action dated Sep. 18, 2013 in U.S. Appl. No. 12/474,023, 14 pages.

Non-Final Office Action dated Jun. 8, 2012 in U.S. Appl. No. 12/474,023, 16 pages.

Notice of Allowance dated May 5, 2017 in U.S. Appl. No. 12/474,023, 15 pages.

* cited by examiner

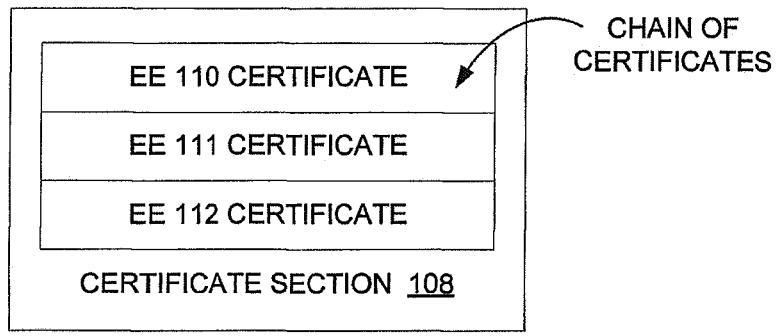
FIG. 4 -- PRIOR ART --
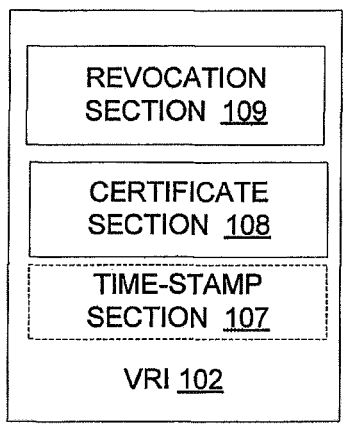
FIG. 5 -- PRIOR ART --
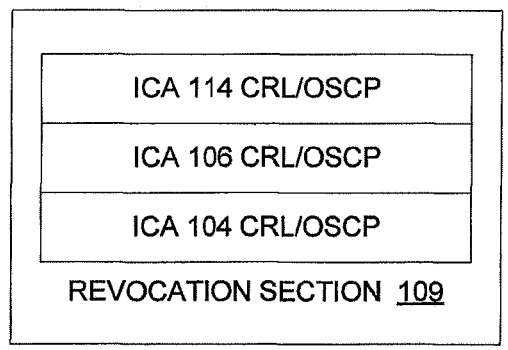
FIG. 6 -- PRIOR ART --

METHODS AND APPARATUS FOR VALIDATING A DIGITAL SIGNATURE

CROSS-REFERENCE TO RELATED APPLICATIONS

This application is a continuation of and claims priority from U.S. application Ser. No. 12/474,023, filed May 28, 2009, which is assigned or under obligation of assignment to the same entity as this application, the entire contents of the application being herein incorporated by reference.

BACKGROUND

Electronic documents are increasingly replacing paper documents in a wide variety of applications in business, legal, personal, entertainment, and education environments. Electronic documents and other electronic content formats introduce content protection and source verification challenges. Security mechanisms implement access policies and thus protect the electronic content. Authentication mechanisms verify the source of a document through use of digital signatures and certificates. Many of these techniques, however, introduce constraints and requirements making the process burdensome.

SUMMARY

Various embodiments herein are directed to at least one of systems, methods, software, and data structures for authentication of an electronic document and other electronic content formats. Some such embodiments include accessing an electronic document and appending a digital signature to the electronic document. Such embodiments may further include retrieving collateral information for the digital signature. The collateral information may include validation-related information. Next, at least a portion of the collateral information may be added to a set of collateral information for the signed electronic document. The set of collateral information may then be stored with the signed electronic document. These and other embodiments are described herein.

BRIEF DESCRIPTION OF THE FIGURES

Some embodiments are illustrated by way of example and not limitation in the figures of the accompanying drawings in which:

FIGS. 4-6 illustrate digital signature, certificate, and collateral information formats used for signing documents.

DETAILED DESCRIPTION

Figure 1:
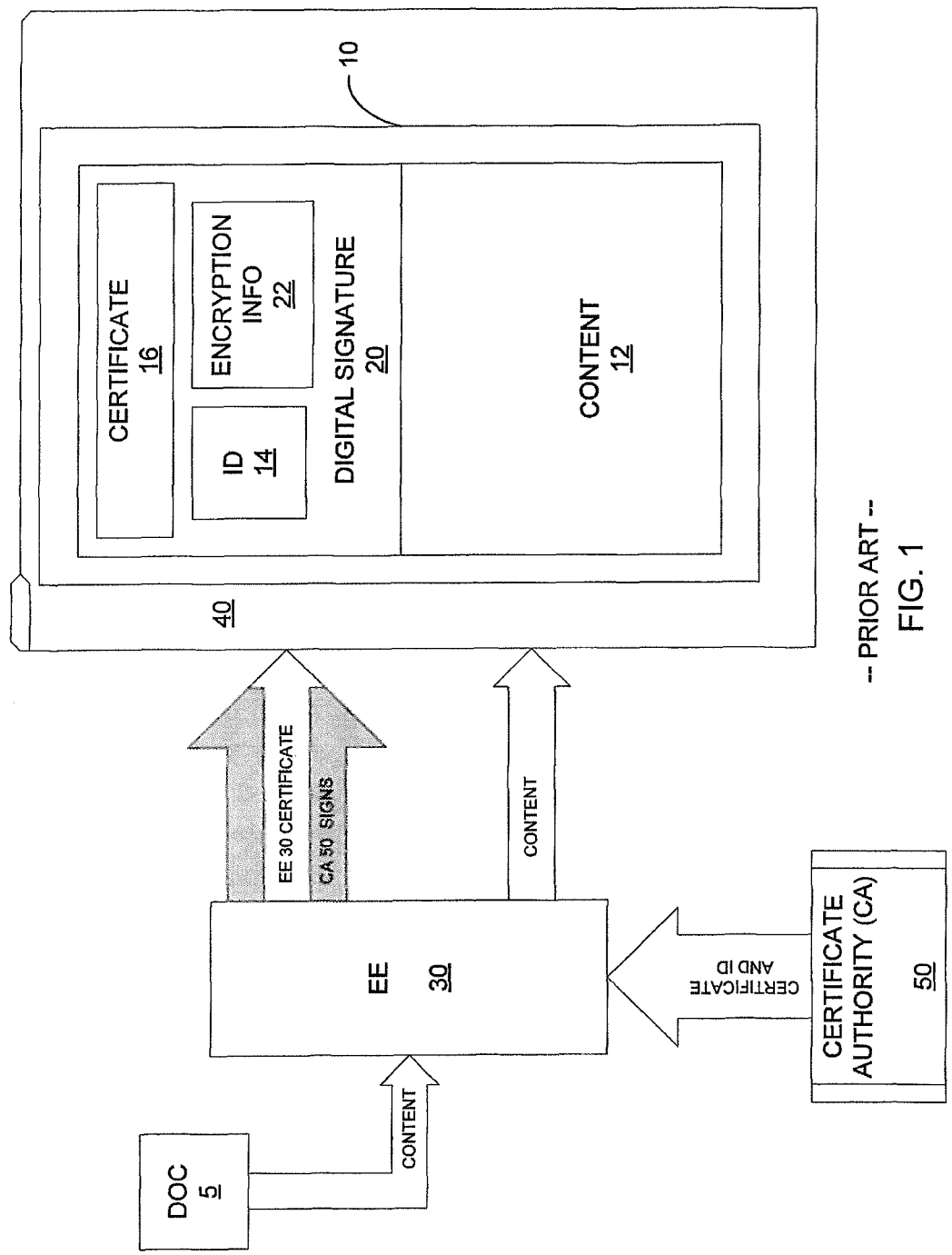
FIG. 1 is a block diagram illustrating authentication mechanisms to verify the source and content of an electronic document.

The following description is directed to systems, methods, software, and data structures for authentication of an electronic document and other electronic content formats. As used herein, document is used interchangeably with other forms of electronic content. Certificates that are used in the various embodiments that included signing documents with digital signatures have a limited time during which they are valid. After a certificate expires, a corresponding digital signature may not be validated. Validating a digital signature, in some such embodiments, includes checking the validity of the certificate, which includes building a certificate chain to a trusted anchor, and requesting confirmation from the authority that issued the certificate that the certificate has not been revoked.

Methods to allow validation of a digital signature after certificate expiration employ methods to collect validation information and include this information with the signature. Such methods allow the digital signature to be validated at a future time. The method of collecting the validation information and including it with the signature provides Long Term Digital Signatures Validation (LTV) capabilities. The existing LTV methods consist of inclusion of the validation information in the signature itself. For some document formats this means that LTV information can be collected and included in the digital signature only at the time of signing. A problem exists when the signer needs Internet access to collect LTV information and the Internet access is not available at the time of signing.

In various embodiments discussed herein, the LTV information is provided separately from the digital signature, allowing the addition of LTV information to a digital signature at a time later than the time of signing and by a user, human or logical, other than the signer of the document. Adding LTV to a document removes the need to access the Internet, or other network, for signature validation. As a result, the time to validate a document is reduced and workflows are improved.

Further, such embodiments may allow later addition of LTV information to a document created or signed at a time when the LTV information was not available, such as for a traveler on an airplane without network access. In one embodiment providing a document having incremental save capability, post-signing addition of LTV information is allowed. The addition of the LTV information is made in an incremental update without a need to modify the signed document itself.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

The following discussion relates to a variety of electronic content, as well as authentication techniques for verifying the source of the electronic content. Electronic documents cover a broad range of applications, formats, content types, and media. Electronic documents are exchanged between different platforms and in a variety of ways. A document may pass through various networks, including wired networks and mobile networks, and may be stored on various storage mediums. As a document is processed and transferred, it is desirable to control the document and authentication of the contents. There are many methods of reliably authenticating and controlling files in these situations.

The authentication techniques discussed herein are applicable to source authentication of documents, electronic messages, electronic communications, and other data and information processing. In the present discussion, authentication refers to authenticating the source of a document having a digital signature. One class of common digital signature application generates a digest or dictionary for the content of the electronic document and encrypts the digest using a private key obtained by the signing entity in order to generate the digital signature. The digest can be generated by calculating a hash value of the electronic document according to a digital signature algorithm provided by the digital signature application.

As used herein, an entity may refer to: i) a person, such as a person signing a document or processing a document; ii) a group, such as a group having a common group signature or authority; iii) a computing device; iv) a computing node in a networked system; v) a storage location, such as a memory storage unit storing a document; vi) a virtual point in a network, such as representing a business function within a business enterprise, and the like. Additionally, an entity may represent a point in a workflow, such as for authorization, which may be performed by a person responsible for that aspect of the workflow or a computing device which provides an automated check in processing the document. The term entity is not meant to be limited to any one of these examples and may extend to other situations consistent with the concepts described herein.

A digital signature may use a Public Key Infrastructure (PKI) technology to establish authenticity of documents. PKI systems use certificates and keys to identify individuals or organizations. The owner uses a key to "sign" a document, and the recipient uses a key to verify the digital signature and the authenticity of the signed document. Supporting technologies help establish other non-repudiation features, such as the time of signing and the status of the signing keys.

Digital signatures employing public key cryptography employ a private key to create the digital signature, and a public key to verify the digital signature is in its original form. Computer equipment and software implementing a public key technique are referred to as an asymmetric cryptosystem. The public key may be provided to the recipient individually, or by publication in an on-line repository or directory. While the private key and the public keys are mathematically related, in a secure asymmetric cryptosystem it is difficult to derive the private key from the public key.

In some embodiments, once a document is signed, the signature may not be changed or modified, but other signatures may be added. For example, in a workflow of approvals, each entity in the workflow may apply a signature to the document. In this case, the document will include multiple signatures. In another embodiment, the signature is provided in a predetermined fixed-length field portion of the document. In various embodiments, changing information associated with a signature may involve application of additional signature(s) and may incur additional overhead information. The overhead information may include information used to validate the signature, and is referred to as collateral information. This may be the case, where the original signature includes a first set of collateral information, and the second signature includes a second set of collateral information, wherein the second set of collateral information includes information contained in the first set of collateral information. In this way, the resultant document containing both signatures also includes duplicative or redundant information. This increases the size of the document as well as incurring additional processing time.

Certain example authentication techniques discussed herein may reduce the size of document overhead, as well as providing a flexible method for providing information for later authentication of at least one of a signature and content of a document. These techniques are applicable to documents which are created, signed, and stored in memory storage or transmitted to another location or entity. In some situations, a document may be signed at a first time and accessed at a later time, such as years later. In these situations, it is desirable to have all of the overhead information included with the document for such later processing to avoid situations where such validation information is no longer available.

Additionally, some document formats allocate a field for the digital signature that does not allow for addition of information to the digital signature. The Portable Document Format (PDF) is one example of a document format that supports allocating a field for the digital signature that does not allow modification of the signature. PDF is a file format for document exchange used to represent two-dimensional documents in a manner independent of the application software, hardware, and operating system. In this and other formats, a digital signature is attached to a document and stored or transmitted therewith. Similarly, the digital signature may be sent or stored as a separate data element maintaining an association with the document. Documents, data and information, such as PDF documents, may be transmitted from one entity to another, or may be stored in a database or memory storage location for later access. Each format may introduce specific criteria or restrictions on use of the digital signature.

Digital signatures may include any of a variety of mechanisms for authenticating the identity of a message sender or a signer of electronic content (e.g., an electronic document). In some example embodiments, the digital signature may ensure that original message content or sent electronic content is unchanged.

Standard digital signature processing may be combined with certification signature processing to develop strategies that address specific needs and goals of a system or business. Some software applications, such as the Adobe Reader® and Acrobat® applications of Adobe Systems Incorporated of San Jose, Calif., and some other Page Description Language ("PDL") applications, may automatically check the authenticity of a digital signature. Authentication may be done when a document is opened and may provide a display of a digital signature data including a representation as to the validity of the digital signature.

Some digital signatures have an associated digital certificate to establish credentials associated with the sender or provider of a document, and may employ one of a variety of standard techniques. One certificate method is identified by X.509 entitled "Internet X.509 Public Key Infrastructure Time-Stamp Protocol (TSP)," promulgated by the Internet Engineering Task Force (IETF) as Request For Comment (RFC) 3161, dated August August 2001. The certificate typically contains a name, a serial number, expiration date (s), a public key, and the digital signature. Digital certificates may be stored in registries, which are typically maintained by a Certification Authority (CA) as discussed in detail hereinbelow. When used for an electronic message, the digital certificate provides the recipient of the electronic message with a way to encode a reply message. To send an encrypted message, the sender first applies for a digital certificate from a CA. The CA issues an encrypted digital certificate containing the applicant's public key, and may include other information, such as identification information. The CA makes the CA public key readily available by publication, such as in a printed document or otherwise on the Internet, and so forth.

When a signature is applied to a document, the certificate may be stored with the document, such as in local document storage with the document, or on an external storage device, such as a smart card or token, where the certificates may be accessed in response to accessing the document. Each signed document has a designated certificate containing information specific to the document. In many cases, smart card and token-based certificates provide high assurance digital signatures because they more effectively limit unauthorized use. There are emerging technologies, such as Trusted Platform Modules (TPM) and Roaming Credentials (RC), which offer a level of trust and security comparable to smart card and token-based certificates. TPM is a type of secure crypto-processor for storing cryptographic keys for protecting information.

Signatures providing certificates for authentication may be referred to as certification signatures and may employ the authentication techniques discussed herein. Certification signatures are useful for documents that are used outside the author's control. Certification signatures, or certificates, are helpful for detecting changes that may occur to a document during or between subsequent signings. Documents having a certificate signature are referred to as certified documents.

In processing documents with certificates, the certificate method is configured to operate with the signature processing. In one embodiment, a document processing application, such as to read or modify a document, may be used to apply a digital signature. Some document processing applications, such as word processing applications, workflow processing applications, and enterprise applications provide an option to sign a document.

When a signed document is later accessed, the digital signature is verified. For verification, the document processing application checks the digital signature using a public key to compute a new hash value. The new hash value is used to confirm that the digital signature was created using the corresponding private key. Such confirmation involves comparing the new hash value, which was computed with the public key, to the original hash value, which was transformed into the digital signature using the private key. A match of the new hash value to the original hash value verifies the digital signature. A variety of hash operations may be used in such processes. For example, the hash operations may include Message Digest (MD)2, MD4, MD5, Secure Hash Algorithm (SHA), and so forth.

Figure 2:
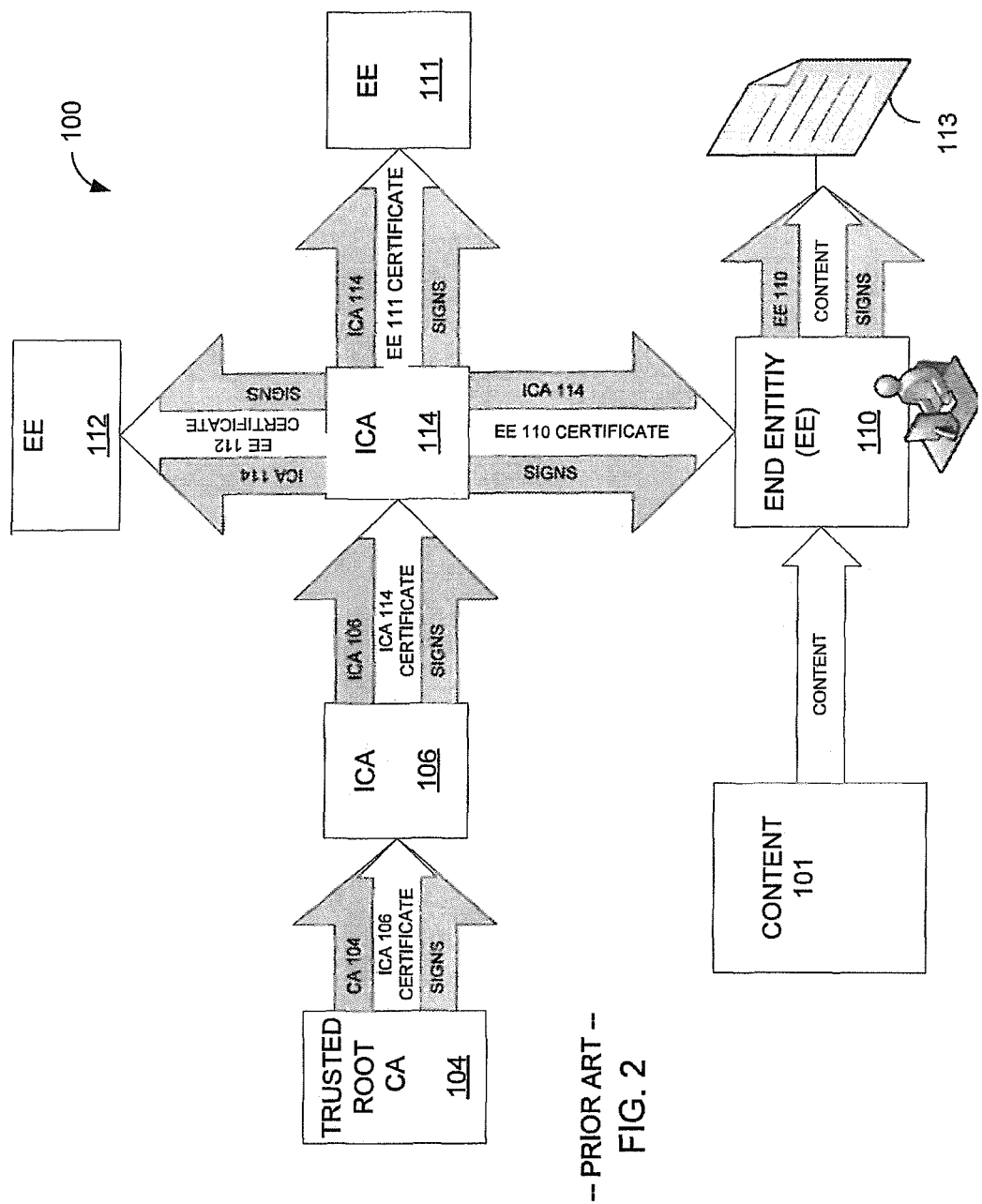
FIG. 2 is a block diagram illustrating a certification chain for processing documents, implementing an authentication mechanism.
Figure 3:
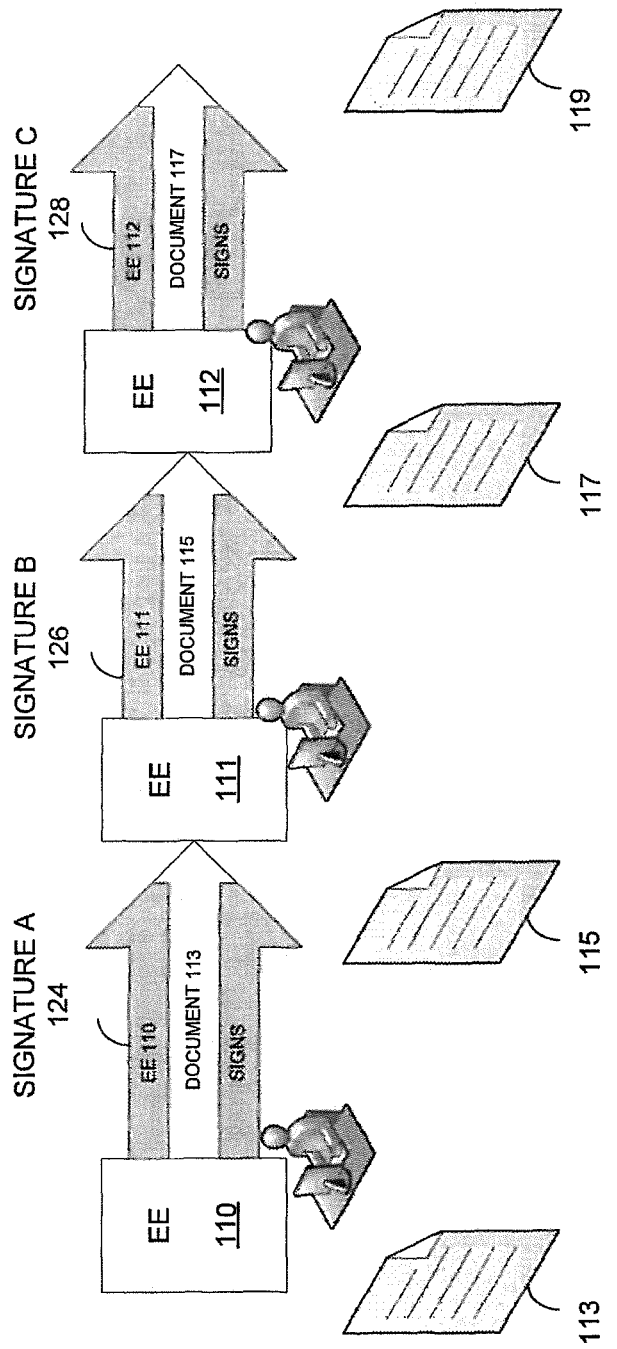
FIG. 3 is a block diagram illustrating document processing according to the certification chain of FIG. 2.

FIGS. 1-3 illustrate various certificate chains, where each End Entity (EE) receives a certificate issued by a CA. As used herein, the term "EE" may refer to the user, the user's computing device, or the user's certificate. The certificate is issued by a CA, and it is the CA that will later authenticate the certificate. The CA generates the collateral information, including authentication and revocation information. A user, or entity, creates a document and applies a signature to the document.

As illustrated in FIG. 1, CA 50 issues a certificate to EE 30. EE 30 may use the certificate when applying a signature to a document or other electronic content. As illustrated, EE 30 receives document 5, which is used to generate the signed copy, document 10. In another embodiment, EE 30 may create the content for a document, which is then signed using the certificate issued by CA 50. The document 10 is created by EE 30 or a different user. For example, the EE 30 may be one entity providing approval and a signature for a document within a workflow. In this case, the EE 30 does not create the document, but rather signs the document to provide approval. In another example, the EE 30 receives a document, modifies the document, and then signs the modified document.

As illustrated in FIG. 1, the document 10 includes content 12 and a digital signature 20. The EE 30 adds the digital signature 20, which may be generated using an encryption mechanism at the user's computing device, or may be created using a separate service running on a different computing device, such as a central server in a distributed network. The digital signature 20 in the example is appended to the content 12. The digital signature 20 includes a unique identifier (ID) 14, a certificate 16 to authenticate the source of the digital signature 20, and encryption information 22 which provides sufficient information to decode the content 12. The ID 14 corresponds to the document 10 and may be a digest of the content 12. The encryption information 22 contains the public key for EE 30. The user's private key is used in the method of creating the document 10, as the user encrypts the content 12 and the certificate with the user's private key. The public key is then provided in the encryption information 22 of digital signature 20 and is available for use when the document 10 is later accessed. The public key is used for validating the digital signature 20. In this way, anyone is able to validate the digital signature 20, but only the owner of the certificate, i.e., the signer, is able to create the digital signature 20. The document 10 is stored in a file storage system, the file 40, and is referred to as a signed document, as it is a document 10 having a digital signature 20.

The encryption information 22 includes encryption key information to decrypt the content 12. The recipient of the document 10, or an entity accessing the document 10, uses the public key to decrypt the digital certificate attached to the document 10, to verify that the content 12 is as issued by the CA 50. The EE 30 certificate becomes the possession of the document signer, wherein EE 30 refers to the document signer at a computing device. The document signer uses the EE 30 certificate to sign the content. The certificate 16 is a copy of certificate EE 30 without the private key. The recipient of an encrypted message uses the public key of certificate 16 to decrypt the digital certificate attached to the message and to verify the certificate as issued by the CA 50. With this information, the recipient can send an encrypted reply.

As illustrated in FIG. 1, EE 30 received the certificate directly from CA 50, however an EE may receive a certificate through an authentication chain including multiple certification authorities. FIG. 2 is a block diagram illustrating a certification chain for processing documents, implementing an authentication mechanism chain 100. The trusted root CA 104 issues a certificate for Intermediate CA (ICA) 106, which allows the certificate owner to sign certificates. The ICA 106 then issues a certificate for ICA 114, which allows the certificate owner to sign certificates. The ICA 114 may then issue certificates, which allows the certificate owner to issue certificates to multiple EEs, such as EE 110, 111, and 112. The signer of content 101 uses the EE 110 certificate to sign the content and create document 113. Consider the situation where the document 113 is later accessed by EE 111 and EE 112. In this case, the content 101 is signed with three different certificates corresponding to: EE 110, EE 111 and EE 112. Additionally, each of the certificates, such as those certificates used by EE 110, EE 111, and EE 112, has an authentication chain 100, including ICA 114 certificate, ICA 106 certificate. Authentication of each of the certificates, EE 110, EE 111, and EE 112, in the authentication chain 100, requires verification of these certificates.

To verify a signature or signatures of a document, the recipient or user seeking to access the document, may implement a method to verify the chain of certificates back to the root CA 104 indicating that this certificate is known to be good. The signature validator designates one of the certificates in the chain as a "trusted root" or "trust anchor." In many cases this is the root CA 104 in the chain. The validation then checks that the certificates in the chain from the EE to the trusted anchor are valid.

The root CA 104 may provide certificates to other CAs, such as ICA 106, each of which may generate additional certificates. A method to verify a certificate from one such ICA will typically involve revocation information received from its issuing CA. Any CA in the chain may be designated as a trusted root. The chain verification method stops at the CA designated as a "trusted root." The method determines which certificate in the chain is from the trusted root or anchor.

There may be any number of ICAs issuing certificates in a chain, such as chain 100, and verification of any of these ICAs involves verifying each certificate back to the trusted root. For example, a CA may offer certificates as a trusted root, where a cost is associated with each certificate. A business may decide to purchase a certificate service from a trusted root CA, such as a company that provides certificates. As verification may incur a processing burden to the CA, in responding to requests for authorization and maintaining records relating to the certificates, these companies typically charge for the service. The business purchasing certificates from such a trusted root CA may then add an internal CA or chain(s) of ICAs to distribute certificates to various groups within the business. The business ICAs then issue and distribute certificates throughout their business organization. This distribution of certificates allows ICAs to maintain a manageable number of certificates. Each certificate used by the business is verified by evaluating the chain of ICAs back to the original trusted root CA. In one example, the authorization method is done for the ICA of closest instance, such as ICA 114 in FIG. 2, and is then repeated for each ICA and CA in the chain, such as for ICA 106 back to the trusted root CA 104 of chain 100.

As illustrated in FIG. 2, for example, verification of the EE 110 certificate uses information from the issuing certificate authority, ICA 114. Verification of the ICA 114 certificate uses information from the issuing certificate authority, ICA 106, and so on back to the trusted root CA 104, which verifies the ICA 106 certificate.

An example scenario is illustrated in FIG. 3. FIG. 3 is a block diagram illustrating a document processed according to a certification chain. Here EE 110 receives a document 113. The EE 110 may have received the document in an email, from a networked server, or may be accessed from a memory storage location, such as folder 40 of FIG. 1. The EE 110 signs document 113 with the EE 110 certificate, as illustrated in FIG. 2. The signature applied by EE 110 is illustrated as signature A 124. The EE 110 generates signed document 115, including content 113 and the EE 110 certificate. The document 115 may be transmitted to EE 111 or may be stored in memory storage and then accessed by EE 111. When EE 111 accesses document 115, the signature A 124 is verified and then the EE 110 certificate is verified, which includes verifying the certificate from all CAs, including ICAs, back to the trusted root CA 104. In this example, verifying the certificate of document 115 involves verifying, with reference to FIG. 2: the certificate issued by ICA 114, the certificate of ICA 106, and the certificate issued by CA 104.

Returning to FIG. 3, EE 111 receives the document 115 having signature 124. EE 111 then signs document 115 with signature B 126 to generate signed document 117. The document 117 may be transmitted to EE 112 or may be stored in memory storage and then accessed by EE 112.

When EE 112 accesses document 117, the signature B 126 is verified and then the certificate EE 111 is verified, which includes verifying the certificate from all CAs, including ICAs, back to the trusted root CA 104. In this example, verifying the certificate of document 117 involves verifying, with reference to FIG. 2: the certificate issued by ICA 114, the certificate of ICA 106, and the certificate issued by CA 104.

Still further, EE 112 signs document 117, as illustrated in FIG. 3, and generates signed document 119. When another user accesses document 119, the signature is verified and then the EE 112 certificate is verified, which includes verifying the certificate from all CAs, including ICAs, back to the trusted root CA 104. In this example, verifying the certificate of document 119 includes, with reference to FIG. 2, verifying the certificate issued by ICA 114, verifying the certificate of ICA 106, and verifying the certificate issued by CA 104.

Returning to FIG. 3, the document 115 is signed by the EE 110 and includes the EE 110 certificate and collateral information associated therewith. The document 117 is signed by the EE 111 and appends the EE 111 certificate and collateral information associated therewith. Similarly, the document 119 is signed by EE 112 and has appended the EE 112 certificate and collateral information associated therewith. Therefore, document 119 includes all of the certificates and collateral information of all previous entities in the chain that have applied a signature to the document between the initial document 113 and the final signed document 119. The signed document 119 is similar to document 10 of FIG. 1, and includes content and certificates.

Various example embodiments are provided having flexible LTV mechanisms which maintain validation information, making such information available for future use. Such mechanisms and methods avoid redundancy of information propagating with documents having multiple signatures. Additionally, such methods provide sufficient information to authenticate certificates.

To allow verification, each time an additional certificate is applied to a document, additional collateral information is also added. The collateral information enables certificate verification. The collateral information may include a list of revoked certificates, a time stamp, or other information used to verify the authenticity of a certificate and the corresponding signature. When multiple ICAs are incorporated, the collateral information may include redundant information. When the document is accessed, verification processing uses the collateral information and the chain of ICAs back to the trusted root.

The collateral information for each certificate in a chain may have corresponding revocation information. Revocation information may include a Certificate Revocation List (CRL) which contains a list of certificates that have been revoked. For example, ICA 106 maintains a list of certificates which ICA 106 has revoked. There are a variety of formats for this information. One example uses a CRL, while others employ other methods, such as an Online Certificate Status Protocol (OCSP) response which is signed by the issuing ICA and indicates if a specific certificate is revoked or not. Note that additional ICAs, similar to ICA 106, may also be included in the chain. The CRL applies to many certificates but does not contain revocation information for certificates that have already expired. In contrast, OCSP applies to one certificate. Note also, that an ICA may employ multiple techniques for providing revocation information. Also, a certification chain may include multiple certificates, each certificate having a different format for the revocation information. Authorization solutions are designed to accommodate as many of these formats as feasible.

The collateral information of the document 119 includes a certificate section 108 illustrated in FIG. 4. The certificate section 108 of signed document 119 includes the EE 110 certificate, the EE 111 certificate, and the EE 112 certificate. The collateral information of the document 119 further includes Validation-Related Information (VRI) 102, such as is illustrated in FIG. 5. The VRI may include any information that is used to determine whether a certificate is valid. As described in the example embodiments, such information includes revocation information and time stamps, but may include any other information or protocols which are applicable in a specific system to validate the certificate. When a user validates the digital signature, the user accesses the VRI 102. The VRI 102 identifies which certificates have expired or have been revoked. Alternate embodiments may include any of a variety of information related to the validity of the document. The VRI 102 may be obtained from an on-line resource or may be embedded in the signature.

FIG. 5 illustrates components of VRI 102 which identify revoked certificates using a certificate section 108 and a time-stamp section 107. Each CA issuing certificates also provides a list of certificates that CA has revoked. Additionally, the VRI 102 of the collateral information includes a revocation section 109 having Certificate Revocation List (CRL) and Online Certificate Status Protocol (OCSP) information to authenticate certificates. The CRL approach maintains a list of certificates which have been revoked. The OCSP approach provides a mechanism for request and response to authenticate a specific certificate.

FIG. 6 further illustrates revocation section 109, including entries for ICA 114, ICA 106, and CA 104, as illustrated and described with regard to FIG. 2. Each entry includes the revocation information for the respective certification authority. Each additional signature applied to a document increases the amount of collateral information included. Within the collateral information, there may be redundancy.

Verifying the signature of a signed document involves two steps: i) first, verification of the document integrity; and ii) second certificate non-repudiation. Verification involves decryption of the hash value in the signature using the certificate's public key, calculation of the hash of the content, and comparison of the decrypted hash with the freshly computed hash. When the comparison proves the decrypted hash is consistent with the freshly computed hash, the document is unchanged. Certificate non-repudiation involves checking the revocation for each certificate in the chain up to the trusted root. Signature validation determines at which time to check for non-repudiation, such as at signing time or at the current time. If the signature VRI has an associated time stamp, the validation may use the time stamp time to check for non-repudiation.

Further, in some scenarios it may be desirable to access information for which at least some of the VRI is no longer available. In such case, the issuing authority may have eliminated this information. In contrast, LTV policies are implemented to maintain such information for later use. While there are various ways to provide the LTV information, typically it is not possible to amend or change the VRI. In one example embodiment, the VRI is included in the signature allowing changes to the VRI, and thus a more flexible LTV scheme.

As certificates typically have an expiration date, a problem exists when a document is accessed after the expiration period. Similarly, a CA may revoke a certificate, after which the certificate is no longer valid. When the certificate is expired or revoked, the issuing CA will no longer verify the source of the certificate. When an entity desires to access a document after the expiration period, or after revocation, authentication may not be possible. To avoid these situations, an authentication mechanism may implement Long-Term Validation (LTV), which is a feature used in document processing that allows validity checking after the certificate has expired or been revoked. LTV is an enhancement to traditional revocation checking as it extends the accessibility of a document. With LTV enabled, a document processing application captures the certificate's sign-time status and stores it inside the document. This verification certificate remains with the document so that its validity can be determined even at a later date, regardless of whether the certificate has expired or been revoked, or even when the issuing certificate authority no longer exists. Through storage of a certificate's sign-time status in the signed document, the certificate may also be authenticated by the document's signature, further reducing chances of error and fraud. Some documents, such as those documenting transactions and legal records, are time-sensitive. In such situations, the electronic document records the time when the signature is applied and does so in a verifiable manner. By providing this information with the signature, a verifiable record is maintained. Such methods and features increase the accuracy and trust associated with a signature, and the signed document. The LTV is particularly applicable to such documents, where the time is of significance, but document access may be required after certificate expiration or revocation.

There are a variety of techniques for applying LTV to documents. The International Standardization Organization (ISO) standard PDF/A is a file format for long-term archiving of electronic documents, identified as ISO 19005-1:2005, published Oct. 1, 2005. PDF/A is an open standard developed for long-term preservation of PDF documents. While PDF/A has somewhat limited support for digital signatures, its guidance can serve as a baseline for the development of PDF requirements for electronic records.

Existing methods are typically limited by combining the certificate with the signature or by amalgamating collateral information for additional new signatures. These methods result in cumulatively burdensome compilations of information.

To avoid these restrictions, one example embodiment separates the collateral information from the signature in a document and evaluating collateral information to avoid redundancy. The collateral information may be stored in a DSS or a DSS dictionary. The DSS refers to a compilation of information related to validating a digital signature. The DSS may be a repository, or other storage device, for storing information, such as collateral information, for a signature. The DSS may include certificates, revocation lists, and any other information useful for validating a digital signature. The DSS is maintained separately from the digital signature, and allows modification of VRI and other collateral information without altering the digital signature. Those components which are common to more than one signature are stored once, and are not duplicated.

Electronic document workflows often involve the transfer and processing of digitally signed electronic documents. In some workflows, the recipient of a digitally signed document is expected to manipulate the document in some way. For example, such manipulation may include filling in one or more form fields, attaching his or her own digital signature to the document, and transferring the signed document to another entity. When the document is transferred or accessed by another entity, that entity processes the document, which may be simply to open and read the document, or may be to amend, modify, or sign the document. The processing may be part of an approval workflow, such as for a sequence of approvals applied to the document where each approver signs the document and forwards to the next approver. The entity that processes the document may be the original sender or a further entity in the workflow. The digital signature may subsequently be used to verify the identity of the signing entity of the electronic document. The digital signature may also be used to authenticate the signed document by enabling detection of alterations made to the signed electronic document.

Figure 7:
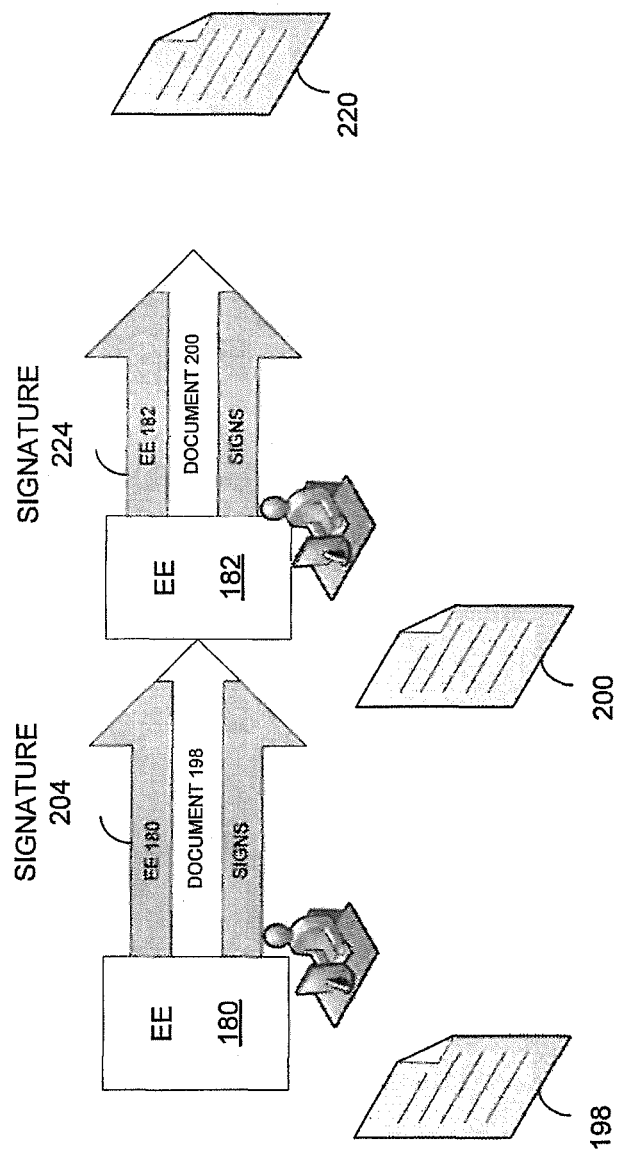
FIG. 7 is a block diagram illustrating a document processed according to the certification chain incorporating a Document Secure Store (DSS) for certification validation, according to an example embodiment.

One example of a document processing flow is illustrated in FIG. 7. As illustrated, the EE 180 receives, processes, and signs a document 198, and employs a method for storing collateral information in a DSS separately from the signature. Collateral information refers to information used to validate the signature of a document, and includes overhead information related to a certificate authority. Collateral information may include other information required to validate the signature. Various embodiments may include a variety of different information to enable interaction with the certificate authority as well as decrypting information required for validation. For purposes of illustration, document 198 is not a signed document, but rather includes content without a signature, a certificate, or a DSS. The EE 180 applies signature 204 to generate signed document 200. EE 182 accesses the signed document 200, which includes the content of the original document 198 and the EE 180 signature 204. The signed document 200 is further illustrated in FIG. 8.

Figure 8:
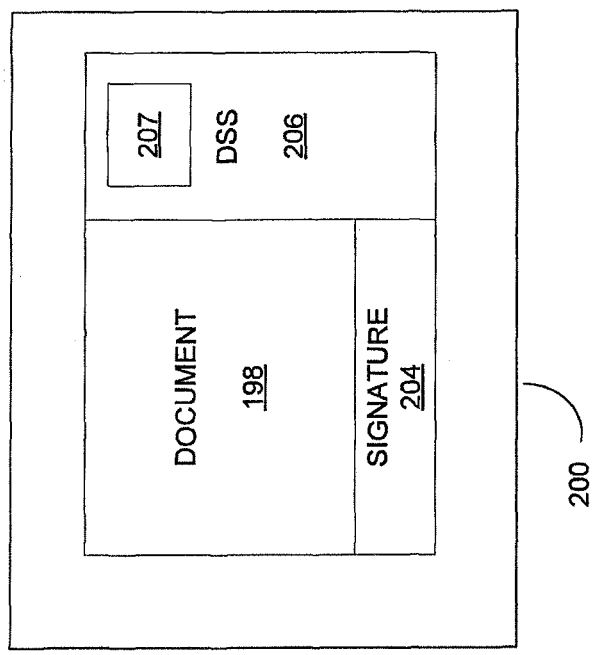

FIG. 8 illustrates a data format of the signed document 200 according to an example embodiment. In addition to the content of document 198 and the signature 204, the signed document 200 includes a DSS 206. The DSS 206 is a compilation of collateral information specific to the signed document 200. For example, the DSS 206 includes revocation information for all certificates in an authentication chain for the signed document 200. The signed document 200 is then accessed and signed by EE 182, resulting in signed document 220. The signed document 220 is further illustrated in FIG. 9.

Figure 9:
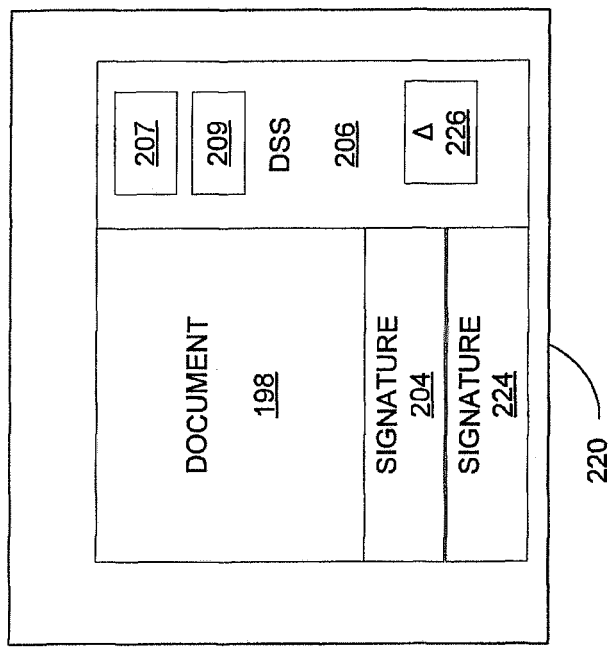
FIGS. 8-9 illustrate a data format including a DSS, according to an example embodiment.

FIG. 9 illustrates a data format of the signed document 220 according to an example embodiment. The signed document 220 includes the components of document 200 plus the EE 182 signature 224 and differential material, A 226, providing any new information to the collateral information already stored in DSS 206. In this way, any duplicative collateral information associated with digital signature 224 is not provided twice, but rather only the different or new information is provided.

As illustrated in FIGS. 8 and 9, the documents 200 and 220 both include document 198 and a DSS 206. The DSS of document 200 includes the signature 204 and corresponding VRI 207 while the DSS of document 220 includes both signature 204 and VRI 207 as well as signature 224 and corresponding VRI 209. The DSS 206 is not included in the document 198 or signature 204, but rather is provided separately, allowing amendment to the DSS 206 without altering signature 204. The DSS 206 includes collateral information used for validating signature(s), which may include a combination of certificates, revocation list information, time stamp information, and so forth. For each signature, such as signatures 204 and 224, the DSS 206 contains references to the collateral information applicable to that signature, such as VRIs 207 and 209, respectively.

As illustrated in FIG. 8, the DSS 206 corresponds to the document signed by a first user and the corresponding VRI 207 includes collateral information for digital signature 204. FIG. 9 illustrates document 220, which is a version of document 200 signed with signature 224. Here the DSS 206 contains the VRI 207 and the VRI 209, which includes collateral information for signatures 204 and 224, respectively. The DSS 206, as illustrated in FIG. 8, initially includes the collateral information VRI 207, corresponding to signature 204, as applied by EE 180. After addition of the signature 224 to the content 198 by EE 182, the DSS 206, as illustrated in FIG. 9, also includes collateral information corresponding to signature 224.

In such embodiments, the DSS 206 includes authentication information separately from the signatures 204, 224. The DSS 206 may later be amended to allow for collateral information to be added as additional signatures are applied. In one embodiment, the collateral information to be added with an additional signature is compared with the information currently stored in the DSS 206. If the collateral information to be added is already present, the additional collateral information is not added again. Thus, amendments of the DSS 206, in such embodiments, are limited to adding collateral information that is not already present. For example, where multiple signatures are applied to one document, redundancy of VRI is avoided.

The DSS 206 may be considered as a container for the VRI 207, 209 components. The VRI 207, 209 components correspond to digital signatures 204, 224, but are detached from the signatures 204, 224. Building the DSS 206, therefore, involves collecting the VRI components for each signature and compiling the components into the DSS 206. In one embodiment, the DSS 206 may be a DSS dictionary made up of arrays of data, other dictionaries. DSS 206 may include a separate array for included components, such as for certificates, CRLs and OCSPs.

As discussed above, FIG. 9 illustrates an example of signed document 220 having multiple applied digital signatures 204, 224 and including collateral information applicable to the digital signatures 204, 224. As examples, additional DSS 206 information may result from additional digital signatures, additional certification authorities, or may result from new or additional revocation information.

When a new digital signature is added, VRI for the new digital signature is to be added to the DSS 206. To determine the A 226, the method compares the VRI for the new signature with that of the existing VRI information, such as VRI 207, in the DSS 206. Any duplicate information is not added, while any different information is added as A 226.

Figure 10:
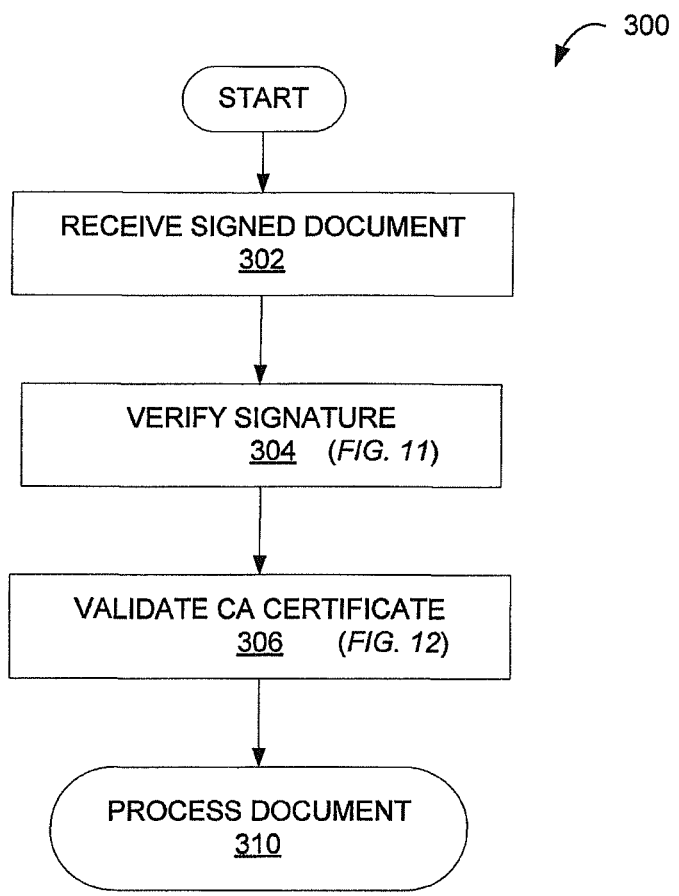
FIGS. 10, 11 and 12 are flow diagrams illustrating various aspects for processing a signed document, according to example embodiments.
Figure 11:
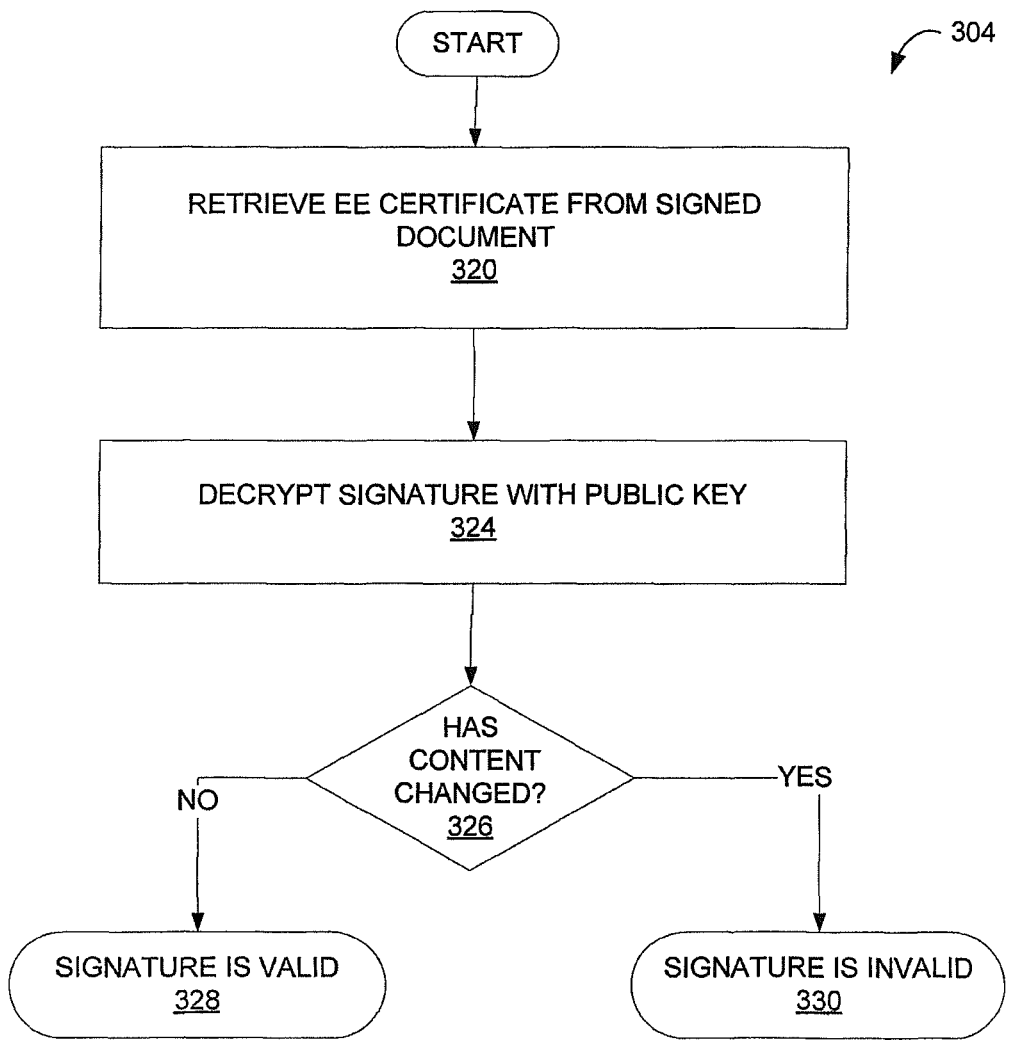

According to an example embodiment, when an entity accesses a signed document supporting a DSS authentication procedure, the entity performs an authentication method 300 of FIG. 10. In such embodiments, the entity receives 302 the signed document and verifies 304 the digital signature of the document. A signature verification method according to one embodiment is illustrated in FIG. 11. When the digital signature is successfully verified 304, the method then validates 306 the certificate chain. The method 300 then processes 310 the document. A detailed example embodiment of certificate validation is illustrated in FIG. 12.

FIG. 11 details method 304 to verify a signature applied to a document. The method 304 initially retrieves 320 the EE certificate from the signed document. The signature is decrypted 324 with the EE's public key. In one example, this is a public key published by the CA that issued the EE certificate. The public key is typically included in and retrieved from the retrieved 320 EE certificate. The method 304 further includes checking 326 to see if document content has changed.

In an example embodiment of the method 304, the signature contains a hash value of the content encrypted with the EE private key. The hash value of the content is then recalculated, the encrypted hash value of the content in the signature is decrypted using the EE public key, and the recalculated value is compared with the decrypted value. A difference between the encrypted hash value and the recalculated hash value indicates a change in the content, such as content of document 198 of FIGS. 8 and 9. When the encrypted hash value and the recalculated hash value are the same, then the signed content has not changed. If the content has not changed, the signature is valid 328. When the content has changed, the signature is invalid 330 and processing stops. As the method 304 is part of the method 300 of FIG. 10, an invalid signature results in termination of the method 300.

Figure 12:
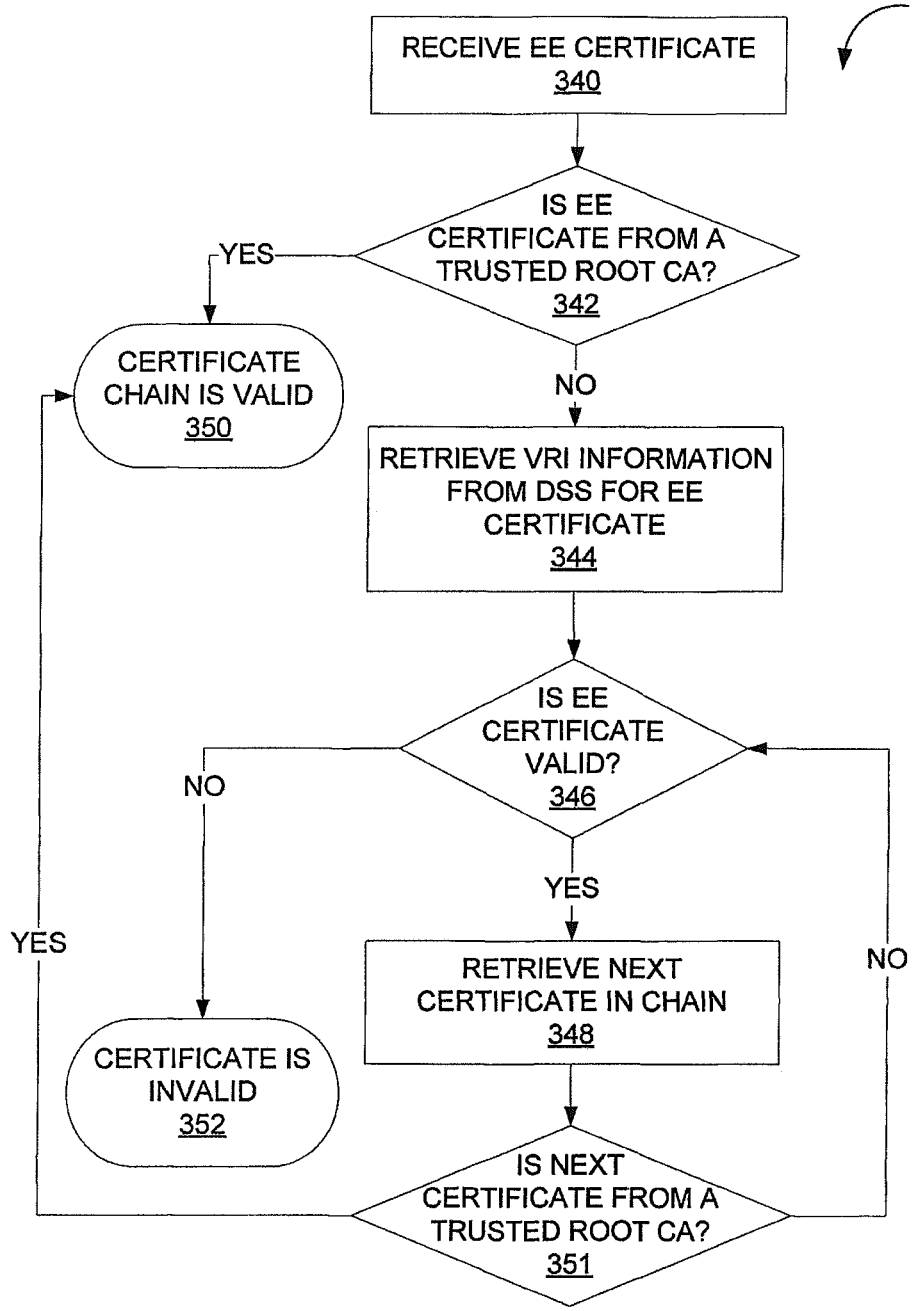

FIG. 12 illustrates an example method 306 to validate the CA certificate, as in FIG. 10. When a CA certificate is part of a certification chain, validation 306 of the CA certificate involves validation of each of the certificates in the certification chain back to the trusted root. To validate a certificate chain, the method 306 starts with the EE certificate and proceeds successively through the chain until the method encounters a trusted root. The trusted root is significant, as the certificate of the trusted root is trusted or known to be authentic. Thus the certificate chain validation ends when the trusted root is found. For certificates other than the trusted root, certificate validation determines the validity of the certificate using information in the DSS of the document. When all certificates of the certificate chain have been validated back to the trusted root, the certificate chain is valid.

As illustrated in FIG. 12, the certificate chain validation method 306 starts on receipt 340 of the EE certificate. The method 306 determines 342 if the EE certificate is from a trusted root CA, and if so the certificate chain is valid. When the certificate is from the trusted root, there is no further certificate validation required. If the EE certificate is not from the trusted root, then the method 306 retrieves 344 the VRI from the DSS of the document. The method 306 then checks 346 the validity of the EE certificate using the VRI. When the certificate is invalid 352, such as for a revoked certificate, the method terminates. When any certificate in a certification chain is invalid, then the chain is invalid. For a valid certificate, the method 306 then retrieves 348 the next certificate in the chain, and checks 351 if the next certificate is the trusted root. If the next certificate is the trusted root, the certificate chain is valid, and if not, the method 306 checks 346 the validity of the certificate.

Checking the validity of a certificate may involve verifying information consistent with the LTV policy implemented. For example, one embodiment may use the VRI information of the DSS to validate an expired certificate. In alternate embodiments, the method may not check if the certificate is expired, as the requisite information for validation is maintained in the DSS and the issuing CA need not be contacted.

Figure 13:
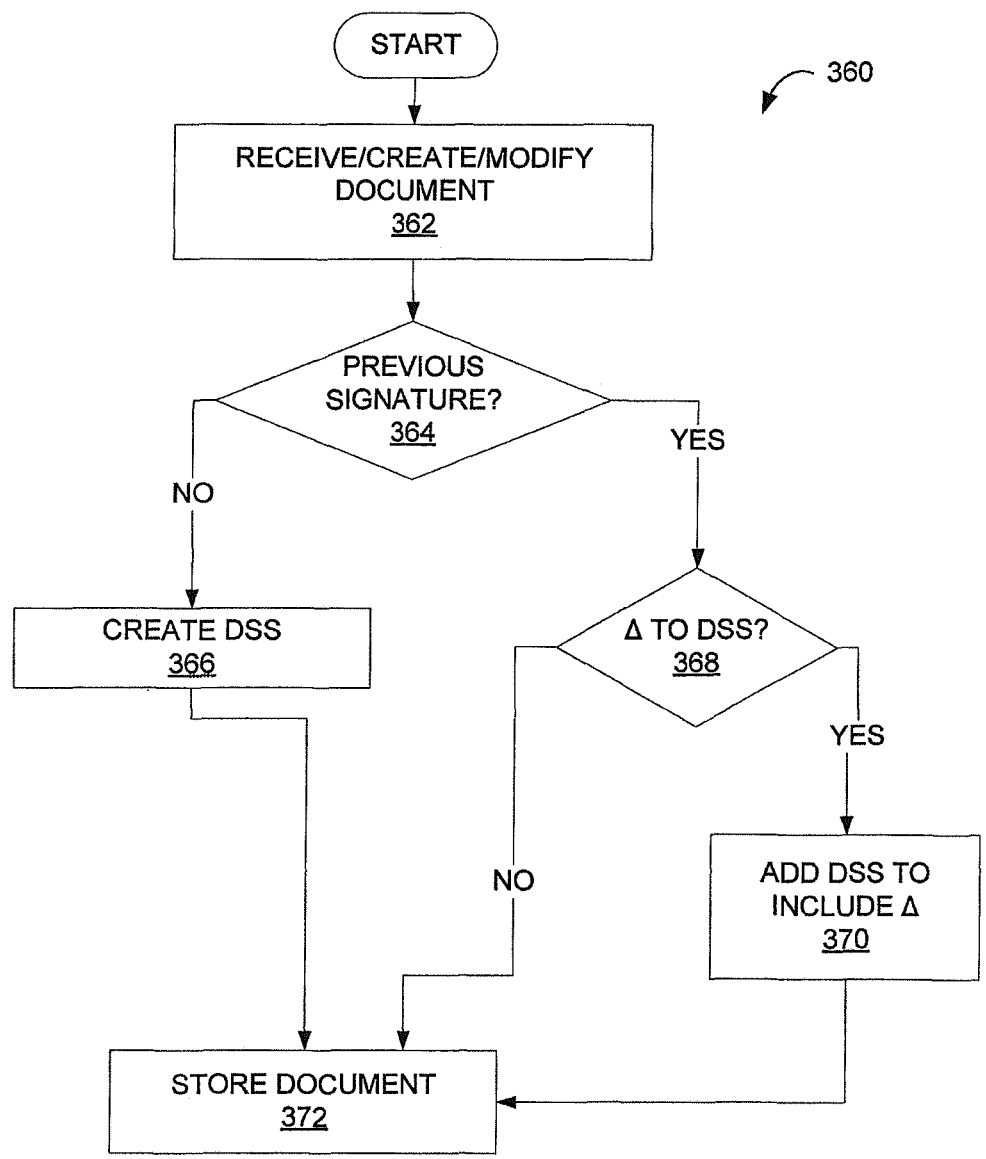
FIG. 13 is a flow diagram illustrating modification of a signed document and creation of a corresponding DSS, according to an example embodiment.

The above examples consider a signed document, such as document 200 of FIG. 8, having a DSS 206 already in place. When the document 200 is first signed, the DSS 206 is created and attached with the signature 204. In one example, the DSS 206 is created as a DSS dictionary, having indexed arrays for storing and retrieving information. In one embodiment illustrated in FIG. 13, a method 360 for creating DSS 206 information for a document begins with access to a document, such as on creation or modification of a document. The DSS 206 may be amended to include additional information for an existing digital signature, such as when the DSS for another digital signature(s) already exists.

The method 360 involves receiving, creating, or modifying 362 a document. While the method 360 of FIG. 13 describes the method generally, reference is made to FIGS. 8 and 9 as an example. The method 360 checks 364 if a previous digital signature(s) has been applied to the document. When there is no previous signature, the method 360 creates 366 the DSS. The VRI information of the new signature is used to create the DSS. When there is a previous signature(s), the method evaluates 368 the new signature. When the new signature has VRI that introduces changes to the DSS, such as changes to the collateral information of previous digital signatures, the information is added 370 to the DSS. Any different or new information, such as collateral information, is added 370 to the DSS, wherein such different or new material is identified as A. The document may then be stored 372.

Figure 14:
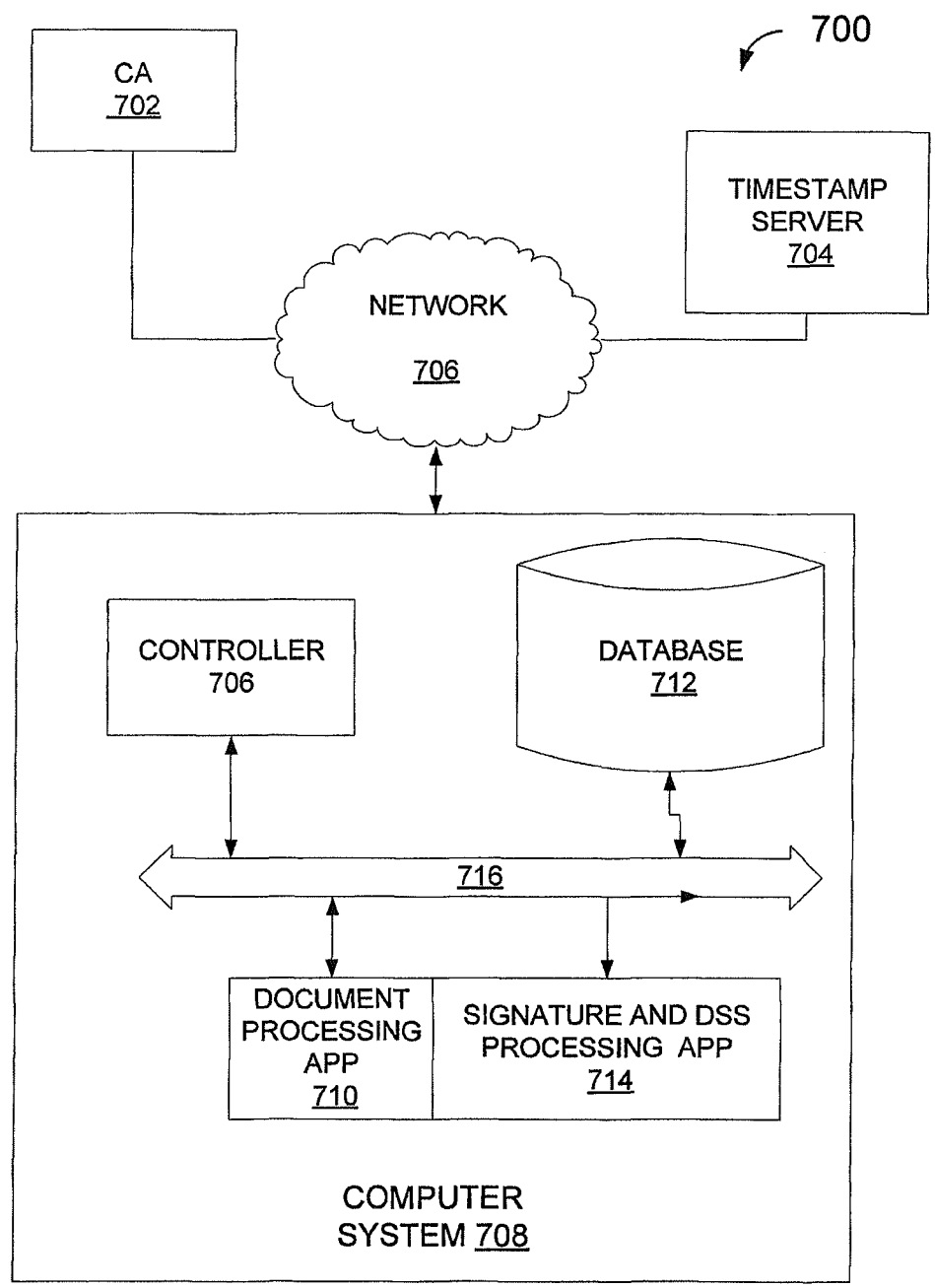
FIG. 14 is a block diagram illustrating a computer system supporting Long Term Validation (LTV) using DSS for providing certificate information separate from the digital signature, according to an example embodiment.

An entity for creating or modifying a DSS 206 will typically access a document processing application. The document processing application may include a signature and DSS processing application, or each may be supplied by a separate processing application or applications. An example embodiment is illustrated in FIG. 14 as system 700. The system 700 includes a computer system 708, such as may be implemented by an EE, for example EE 180, EE 182 of FIG. 7. The computer system 708 stores document content, digital signature information, and VRI. The VRI is provided separately for the digital signature information. The computer system 708 includes a controller 706, a database 712, and a communication bus 716. The communication bus 716 facilitates communications within computer system 708. Further, computer system 708 includes a document processing application 710 and a signature and DSS processing application 714. The various applications and modules within computer system 708 may be provided as one application or module or may be provided as individual applications or modules based on function. The document processing application 710 and the signature and DSS processing application 714 may be configured to follow rules that implement an LTV policy. The LTV policy rules may be stored in the database 712 or in other memory storage (not shown).

The computer system 708 communicates with CA 702, the authority issuing a certificate to computing system 708. The computer system 708 communicates with CA 702 through a network 706, such as the Internet or other distributed network, and with a time stamp server 704. In one example, when a time stamp is used in processing, computer system 708 may request a time stamp from an accurate source, such as time stamp server 704. There are a variety of different ways to get a certificate from the CA to a computer system. For example in another embodiment, an email provides the certificate by a file attachment. Acting as an EE, computer system 708 receives or creates a document, signs it one or several times, and then applies the DSS 206 information to the document. Further, the signature and DSS processing application 714 is adapted to identify modifications to the DSS 206 as part of the A 226 of FIG. 9. The VRI corresponding to one or multiple documents may be stored in the database, or may be stored in other memory storage (not shown).

Figure 15:
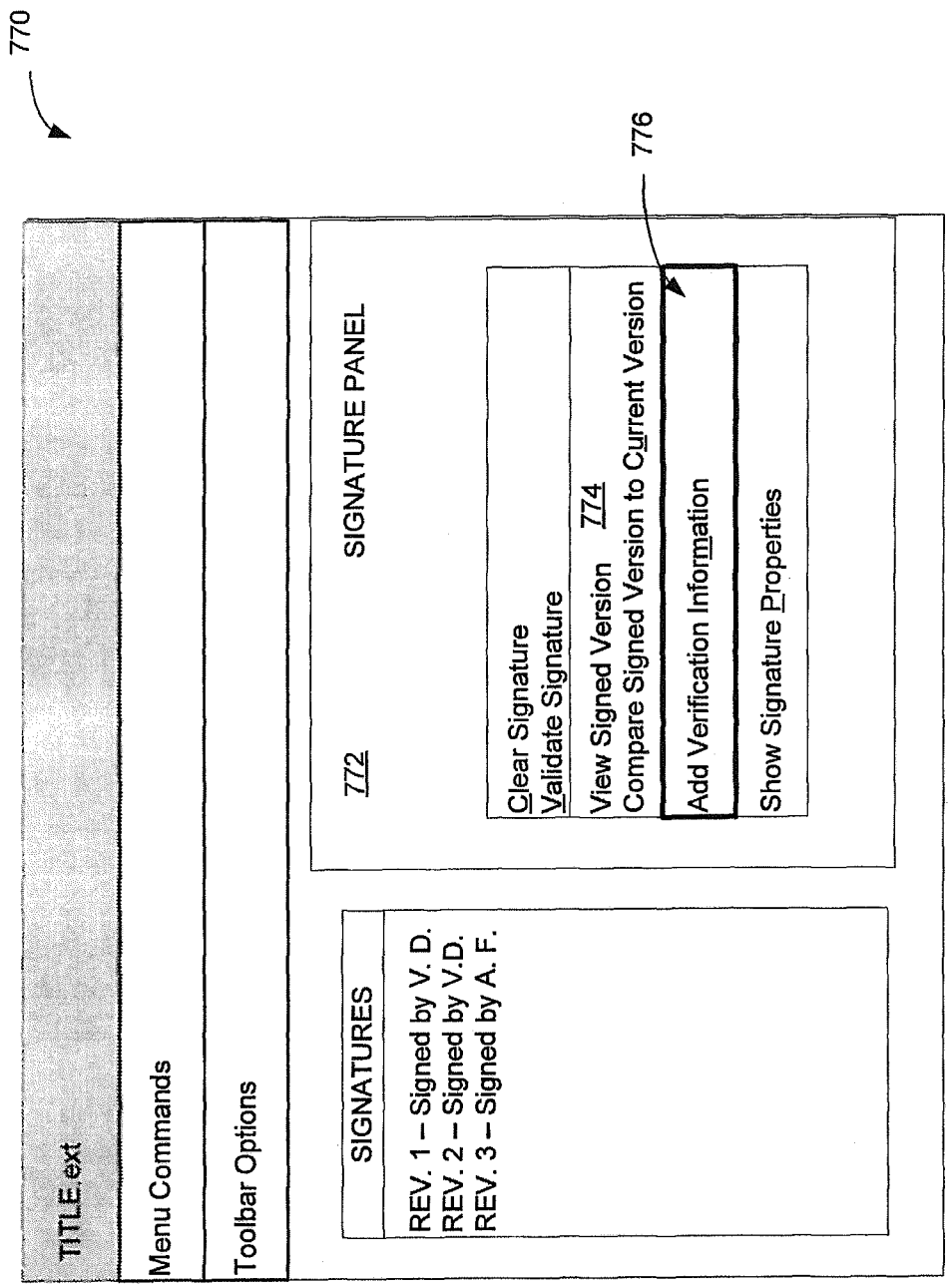
FIG. 15 illustrates a graphical user interface for applying a digital signature to a document, according to an example embodiment.

In one embodiment, the signature and DSS processing application 714 is provided as part of the document processing application 710. The document processing application 710 provides a graphical user interface for a user to sign a document. As illustrated in FIG. 15 an interface provides options to the user, including digital signature preferences.

The interface presents a display 770 having multiple menu options. Display 770 includes a signature panel 774 and a signature window 772. The signature panel 774 lists details for each signature used in the document. The signature window 772 then displays the signature selected in signature panel 774. Here, the user is able to select an option to add VRI to the document. As illustrated, the user has selected the "Add Verification Information" menu item in the drop-down list 776. This command adds VRI corresponding to the selected signature to the DSS associated with the document. The drop-down list 776 is presented on user request, such as a right-click on the signature or a right-click on the signature header presented in the signature panel 774 on the right hand side of the display.

The techniques taught herein may be implemented in a computing environment, including a plurality of modules to perform or cause a processing unit to perform, such methods. The format of the data stored as a document includes the content, the signature, and the DSS. In this way, the various problems identified with other methods are avoided. Specifically, the DSS is amendable after a document signing without invalidating the signature or document content. The DSS reduces the amount of information included with each document, by enabling LTV and reducing redundancy of the VRI. The methods further provide sufficient information to validate a certificate even after the certificate has expired. As the VRI is maintained with the document, therefore, requests to obtain information from CAs are reduced.

Figure 16:
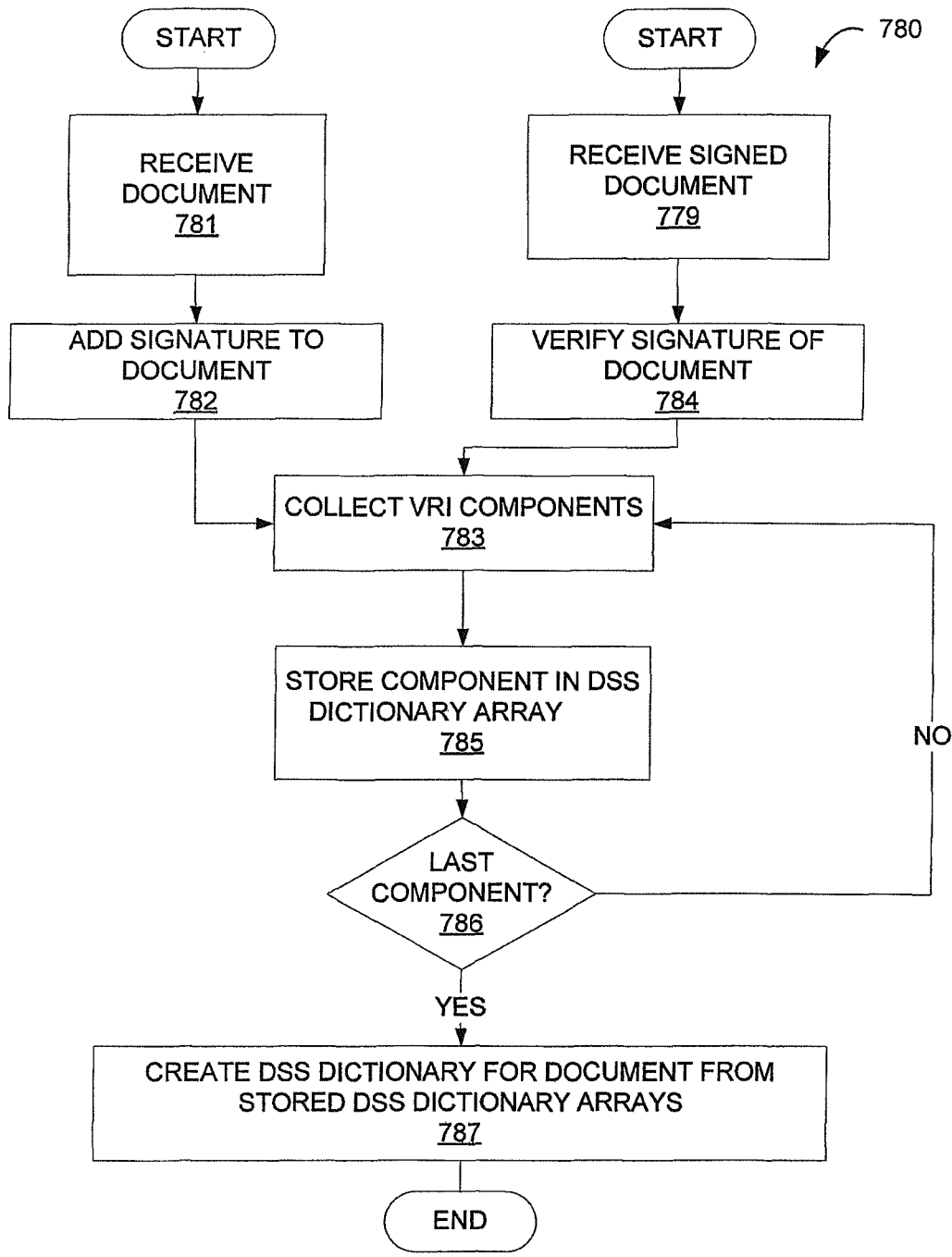
FIGS. 16 and 17 illustrate creation of DSS for a digital signature of a document, according to an example embodiment.
Figure 17:
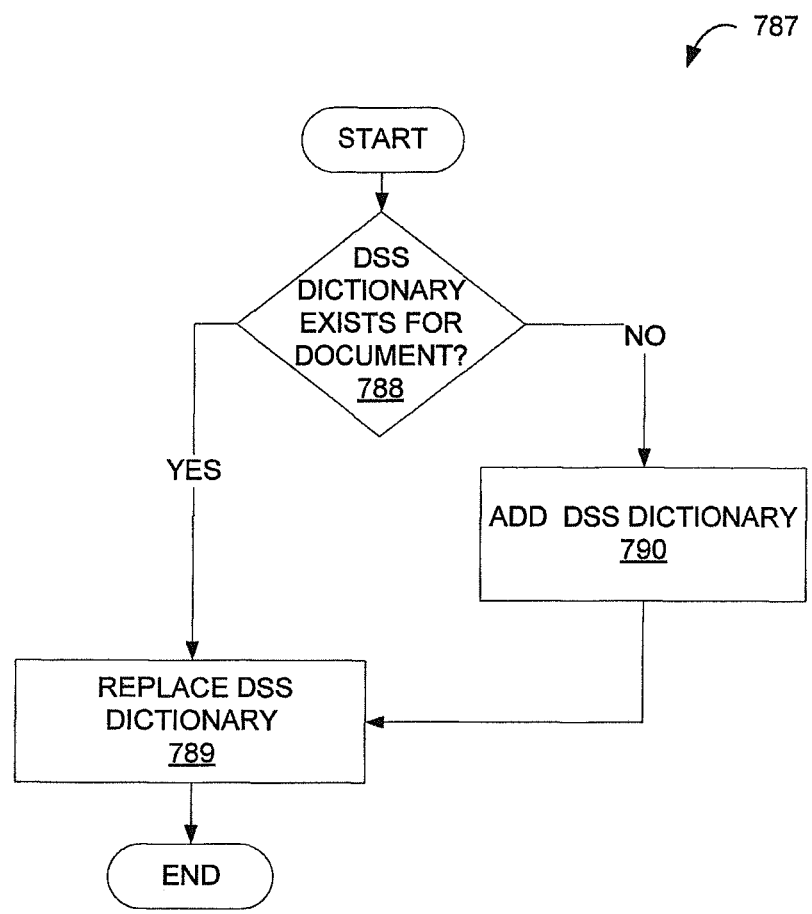

FIGS. 16 and 17 illustrate flow diagrams for techniques to implement a DSS in a document. The method 780 considers an unsigned document or a signed document. A document is received 781 and a signature added 782 to the document. Similarly, for a signed document the method receives 779 the signed document and verifies 784 the signature of the document. Processing continues to collect 783 VRI components for the signature and store 785 each component in a corresponding DSS array. For a first signature in a document, a DSS dictionary array is created to store each of the VRI components. The method 780 then checks 786 if this component is a last component, and if not, returns to collect 783 the next VRI component. After the last component is processed 786, the method creates 787 a DSS dictionary for the document from the stored DSS dictionary arrays. The organization of the DSS dictionary may vary depending on the specific VRI information. For example, revocation information may form one array, time stamp information another array, and so forth.

FIG. 17 further details the method of creating 787 a DSS dictionary as in FIG. 16. The method determines 788 if there was an existing DSS dictionary. For documents that do not have a DSS dictionary, the method adds 790 the DSS dictionary for the signature. Then the collected VRI components are used to replace 789 the values stored in the DSS dictionary.

Figure 18:
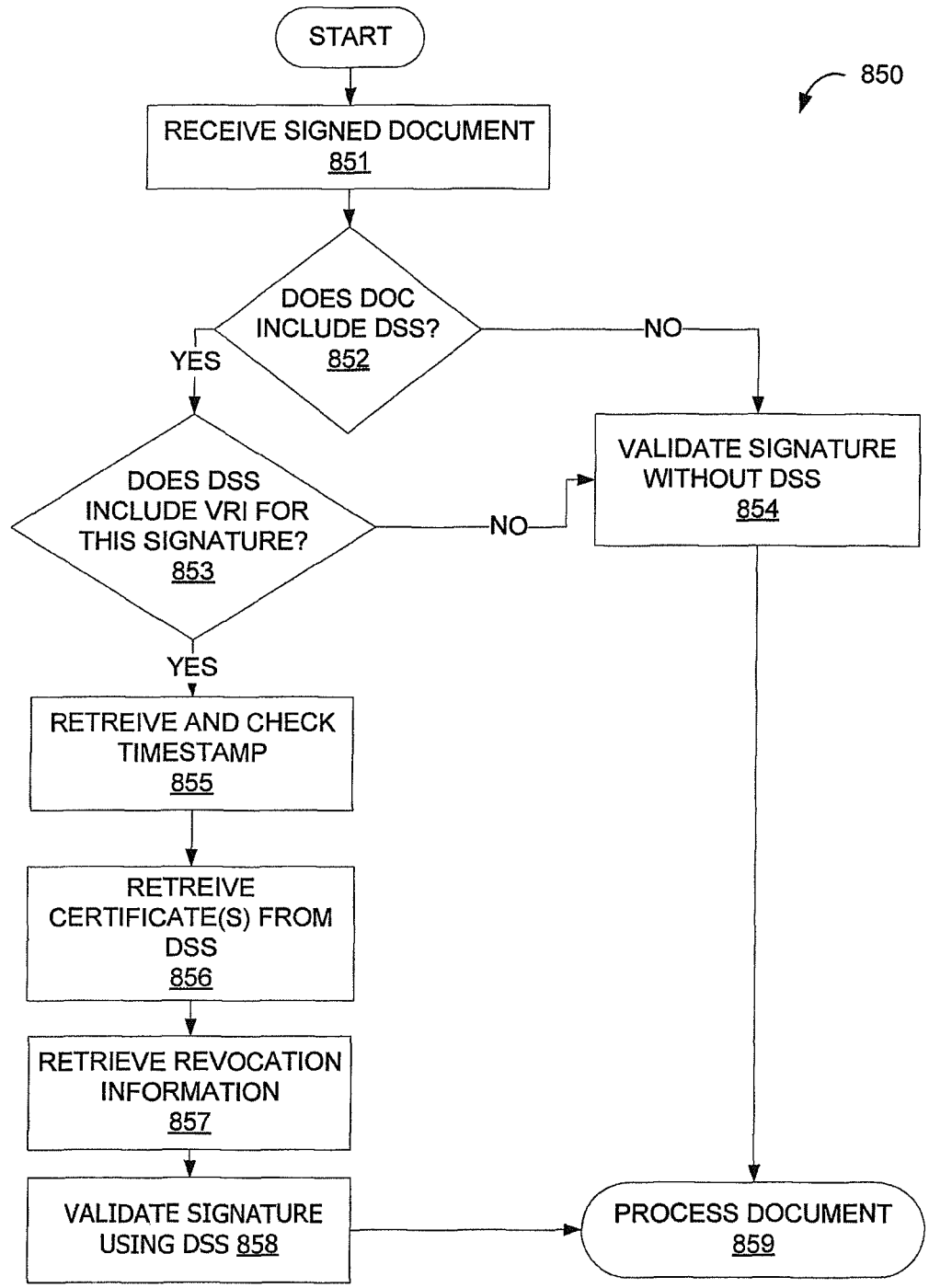
FIG. 18 is a flow diagram illustrating authentication of a digital signature for a document, according to an example embodiment.

FIG. 18 illustrates, in flow diagram form, a method 850 for processing a document. Initially, a signed document is received 851. The method 850 then continues to validate the signature of the signed document. When the method determines 852 that the document includes the DSS, processing continues to determine 853 if the DSS includes VRI for the signature being processed. When the document does not contain a DSS, or when the DSS does not contain VRI for the signature being validated, the method 854 validates the digital signature without the DSS. When VRI for the signature exists, the method retrieves and checks 855 a time stamp. The method then retrieves 856 certificate(s) from the DSS dictionary and builds a certificate chain and retrieves and checks 857 the revocation information. The signature is validated 858 using the DSS. The method completes and the document processing 859 proceeds.

Figure 19:
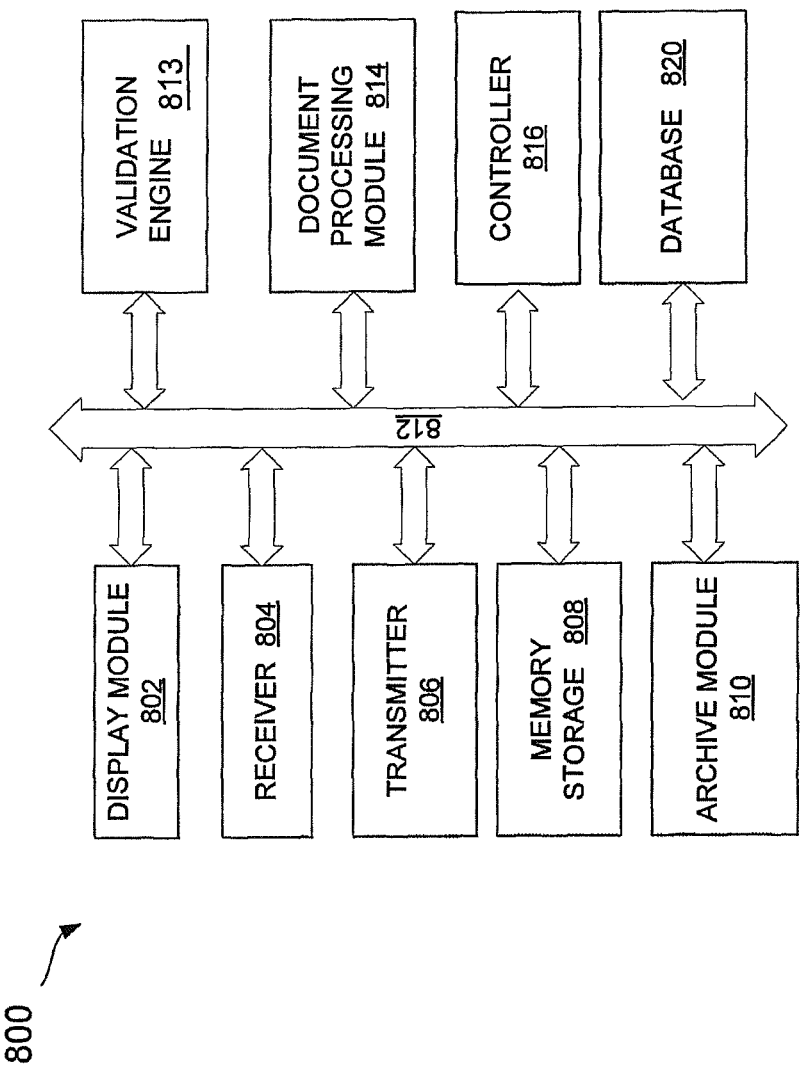
FIG. 19 is a block diagram of a computer system, according to an example embodiment, used to verify digital signatures incorporating DSS for certification validation, according to an example embodiment.

FIG. 19 illustrates a computer system 800 for implementing data processing according to one example embodiment, which supports the LTV method of providing VRI separately from the signature. Computer system 800 is an example of a computing device that may implement one or more of the methods described herein, such as for archiving electronic content including digital signatures. The computer system 800 is adapted for communication through a network (not shown), such as the Internet, or directly with other computing devices.

The computer system 800 includes a display module 802, a receiver 804, a transmitter 806, and a memory storage unit 808 communicating through a communication bus 812. The computer system 800 further includes an archive module 810, a validation engine 813, and a data processing module 814. The archive module 810 stores information related to operation of the computer system 800 as well as certificate, signature and VRI historical information.

As used herein, the term "archive" may be any type of storage of electronic content for any period of time. In some example embodiments, as part of archiving, the profile of the electronic content is such that the content can be reproduced in the future after the content is unarchived. In some example embodiments, the archived electronic content is considered essentially self-contained so that the data needed to reproduce the document is embedded within the content. For example, this embedded data may include raster images, vector graphics, fonts, color information, etc. In some example embodiments, as part of archiving, references to external sources are also removed prior to archiving the electronic content. For example, references to hyperlinks may be removed.

In some example embodiments, a database 820 is included having a machine-readable medium with tangible volatile and/or non-volatile media (e.g., Read Only Memory (ROM), Random Access Memory (RAM), magnetic disk storage media, optical storage media, flash memory devices, and so forth). The database 820 may store archived electronic content generated by the controller 816. While the controller 816 and the database 820 are shown as being in the same computer system 800, other embodiments are not so limited. The controller 816 and the database 820 may be on separate systems. Furthermore, the controller 816 may receive electronic content (from which archived electronic content is generated) from the database 820 and/or a separate machine-readable medium. For example, the controller 816 may receive the electronic content from a separate device coupled to computer system 800 either directly or through a network. The controller 816 may include an application or be part of an application used to display unarchived electronic content for opening, reading, editing, etc. The controller 816 may be software, hardware, firmware, or a combination thereof for executing the various operations described herein, according to some example embodiments.

Additionally within computer system 800 is a document processing application 814, which may be resident in memory storage (not shown) within computer system 800. Document processing application 814 may further be provided external to computer system 800, and accessible by controller 816 and database 820. Document processing application 814 receives instructions from a user to apply a digital signature and in response prepares the necessary information and applies the digital signature to a document. The process of applying a digital signature may include hashing of the signed content and its encryption with the EE private key. Key information may be stored and maintained within computer system 800.

While the system 800 shown in FIG. 19 employs a client-server architecture, other embodiments are not limited to such an architecture, and may instead be implemented with a distributed, service oriented, peer-to-peer or other architecture. The network communication may occur as part of any combination of wired and wireless communication. In some embodiments, network communication may be based on one or more communication protocols (e.g., Hyper-Text Transfer Protocol (HTTP), HTTP Secured (HTTPS), Real Time Messaging Protocol (RTMP), Real Time Messaging Protocol Secured/SSL (RTMPS), etc.).

Operations, according to some example embodiments, are now described. In certain embodiments, the operations are performed when instructions residing on machine-readable media (e.g., software) are executed, while in other embodiments, the methods are performed by hardware or other logic (e.g., digital logic).

During document processing, signatures and certificates are generated at specific points in time. These signatures and certificates have a limited life time during which they are valid. Each certificate may have an expiration date or time after which the digital signature can no longer be verified. After a document is signed, it may be stored in a database or other repository for a period of time before Another Entity, considered the AE, seeks to access the document. In this example, EE is the End Entity that signed the content. The copy of the EE certificate without a private key is included in the digital signature. The AE then has access to this copy of the EE certificate in the digital signature.

During this time the certificate may expire or be revoked. When the AE attempts to access the document, the document processing application running on a computing device of the AE will verify the signature according to the method 312 of FIG. 11.

Verification that a certificate is valid typically involves sending a request to the CA or ICA. In response, the CA or ICA provides an answer either validating the certificate or denying the certificate. The CA or ICA maintains a list of all certificates authorized, including a time of authorization. For each certificate may also be listed a status indicating whether the certificate has expired or been revoked. Similarly, the CA or ICA may maintain a revocation list wherein each entry in the list is no longer valid.

By providing the validation information, such as collateral information, in the document and separate from the digital signature, there is no need to access the CA or ICA each time a digital signature is validated. Additionally, the digital signature may be verified at a future time ensuring that the data was good at the time the certificate was created. The process of collecting such validation information and including it with the document provides LTV capabilities to the document. The LTV information may be provided by an external source or included in the document. The LTV information is used to determine if the certificate is still valid and authentic.

In one scenario, the LTV information is embedded in the digital signature. In such a scenario, it is difficult to add information after signing a document as such a change would effectively result in a change to the digital signature.

For example, an entity may sign a document while off-line and the LTV information is not available. Such a change could then occur when the entity is later online and the LTV information is available, obtained, and embedded in the digital signature. In one example, the entity may be working on a plane and signing various purchase orders. When the plane lands, the entity is able to connect to a networked server to retrieve the LTV information. To add this information to a document involves resigning the document. In other scenarios, the document format may not permit additions to a digital signature after signing, such as in a PDF document. In many of the scenarios the VRI for implementing an LTV policy is included in the digital signature. This makes it difficult or possibly impossible to add VRI to the digital signature after the time of signing.

To enable LTV according to an example embodiment, the VRI is included with the document. The VRI is a collection of collateral information, including certificate information.

Depending on the document type, collection of LTV information is applied to the document at the time of signing the document, wherein the signer accesses LTV information via a networked connection, such as through Internet access to a CA. If the document processing application does not have access to the network at the time of signing the document, there is no way to collect the LTV information necessary to compile the collateral information. Similarly, the recipient of the document, or EE, may be interested in the LTV for a digital signature, and the LTV information was not collected at the time of signing or included with the digital signature.

By providing the LTV information corresponding to a digital signature separately from the digital signature, such as in the DSS portion of a document, it is possible to amend the digital signature at a later time by adding or replacing some of the LTV information contained in the digital signature. When the digital signature is included in the document itself this may prove difficult or in some situations impossible using existing technologies.

The DSS provides a security and authentication mechanism reducing the amount of overhead information included with a document. In a situation where a document is part of a business process flow having many activity points and digital signatures by multiple parties, such as a collaborative document, the streamlining of certificate information also increases transmission speed thus avoiding latency.

Certain document formats preclude modification of a digital signature post-signing, and therefore do not support many LTV mechanisms that add VRI to an existing digital signature or repackage the content and digital signature by adding VRI. A PDF document format does not support such LTV mechanisms. A PDF is a collection of objects, which may include scalar objects, such as strings, names and numbers. Additionally, a PDF may include composite objects, such as arrays and dictionaries. The top level object in a PDF document is a catalog, which is a type of dictionary that contains other objects including other dictionaries.

For PDF documents, adding LTV using the DSS removes the need for Acrobat or other document processing application to access the Internet to access a networked server to verify digital signatures. A direct result is a shorter time to open and verify a document, which improves workflows. In particular, when the work environment requires activities such as proxy authorization whenever the Internet is accessed, a reduction in Internet touch points incurs overall time savings.

Additionally, the storing information in the DSS separate from the digital signature but included in a package with the document, permits addition of LTV and other information to a document subsequent to signing. In one example, digital signatures are applied to a document while the document processing application does not have connectivity to the CA. For example, a user applies a digital signature to a document while traveling on a plane. The information to create the DSS entries is not available at the time of signing, but may be added later once connectivity to the CA is restored.

As used in a PDF document, the DSS dictionary is a new dictionary included in the PDF document catalog. In one embodiment, the DSS contains three arrays: i) certificate array; ii) CRL array; and iii) OCSP array. The DSS further contains a VRI dictionary with an entry for each digital signature in the document. Each entry is another dictionary, and may include an optional time stamp as well as entries that reference CRLs or OCSPs used for digital signature validation. In one embodiment, the key under which the entry for each digital signature is stored in the VRI dictionary is the base-16 encoded SHA1 hash of the digital signature itself.

Still further, a PDF's incremental save capability works with the post-signing addition of LTV information to the DSS dictionary. The addition is made in an incremental update to the DSS without the need to modify any of the bits in the signed document. The PDF format, for example, allows a PDF processor to add or change selected objects in the document, such as by addition of an incremental update section to a PDF document. By separating the DSS from the digital signature, it is possible to process the document at the time of signing, and then add LTV type information later. This avoids issues arising when LTV information is included in the digital signature. According to the operational limitations associated with certain document processing applications, LTV information may be added to a digital signature at the time of signing, but not thereafter. In one example, the digital signature and the DSS information are separately placed in a document, such as a PDF document. A catalog of information, referred to as a PDF catalog, contains the document content and overhead in an indexed form. The catalog will include entries for content, the digital signature, and the DSS dictionary. As used in one example, the term dictionary refers to data container in which each item is identified by its name and can be accessed by this name. Several array entries in this dictionary will contain the collections of all certificates, CRLs and OCSPs. Another entry is a dictionary that contains validation information for all digital signatures in the document. For each digital signature it will contain a dictionary with references to CRLs and/or OCSPs used in the process of the digital signature validation and the time at which LTV information for this digital signature was collected. In one example, the time is stored as a time stamp providing a secure and trusted time or a user specified time.

When the PDF Catalog for a PDF document includes a DSS dictionary with LTV information for a specific digital signature in the same PDF document, the LTV components are used for digital signature validation before using other sources of LTV information. In some situations, the LTV information for a digital signature does not contain an LTV component required for digital signature validation. In such cases, the validation process may obtain the LTV components from other sources, wherein digital signature validation may fail if the required LTV components are not obtained.

Some embodiments may include the various databases being relational databases, or, in some cases, On Line Analytic Processing (OLAP)-based databases. In the case of relational databases, various tables of data are created and data is inserted into and/or selected from these tables using SQL or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Some example embodiments may include remote procedure calls being used to implement one or more of the above-illustrated operations or components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

Figure 20:
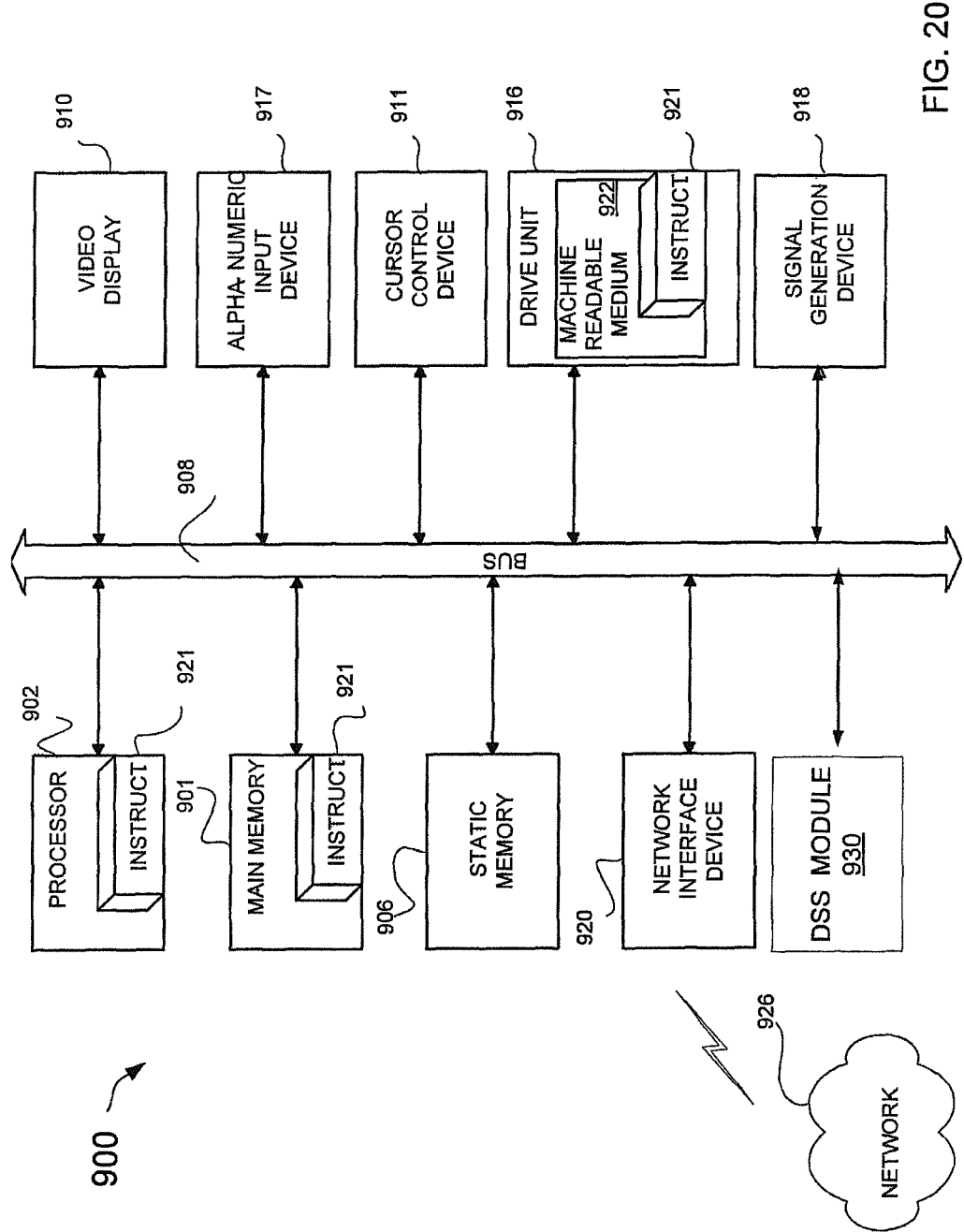
FIG. 20 shows a diagrammatic representation of a machine in the form of a computer system, according to an example embodiment, that executes a set of instructions to perform any one or more of the methodologies discussed herein.

FIG. 20 shows a diagrammatic representation of a machine in the example form of a computer system 900 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 900 includes a processor 902 (e.g., a CPU, a Graphics Processing Unit (GPU) or both), a main memory 901, and a static memory 906, which communicate with each other via a bus 908. The computer system 900 may further include a video display 910 (e.g., a Liquid Crystal Display (LCD) or a Cathode Ray Tube (CRT)). The computer system 900 also includes an alpha-numeric input device 917 (e.g., a keyboard), a User Interface (UI) (e.g., GUI) cursor controller 911 (e.g., a mouse), a drive unit 916, a signal generation device 918 (e.g., a speaker) and a network interface device (e.g., a transmitter) 920.

The disk drive unit 916 includes a machine-readable medium 922 on which is stored one or more sets of instructions and data structures (e.g., software 921) embodying or used by any one or more of the methodologies or functions illustrated herein. The software instructions 921 may also reside, completely or at least partially, within the main memory 901 and/or within the processor 902 during execution thereof by the computer system 900, the main memory 901 and the processor 902 also constituting machine-readable media.

The instructions 921 may further be transmitted or received over a network 926 via the network interface device 920 using any one of a number of well-known transfer protocols (e.g., Hyper Text Transfer Protocol (HTTP), Secure Hyper Text Transfer Protocol (HTTPS)).

A DSS module 930 is communicatively coupled to bus 908. The DSS module 930 implements the digital signature authentication methods discussed in the examples provided herein.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media. In one embodiment, techniques may be implemented by transmissions on carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

In some embodiments, methods may involve executing instructions to provide a module embodied on a computer-readable medium in a computer apparatus to access an electronic document, append a digital signature to the electronic document, retrieve collateral information for the digital signature, the collateral information including validation-related information, add at least a portion of the collateral information to a set of collateral information for the signed electronic document, and use at least one processor, storing the set of collateral information with the signed electronic document in a memory storage location, the set of collateral information.

In some example embodiments, the system and method as illustrated herein may be used to verify documents, where the authentication of the content of the document and the author of the document may be required. This document may be, for example, a university transcript, birth certificate, or other suitable document.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer storage medium storing computer-useable instructions that, when used by one or more computing devices, cause the one or more computing devices to perform operations comprising:
retrieving first validation information from a certificate authority when connectivity thereto is available, the first validation information being retrieved based on a first digital signature having been applied to a content portion of an electronic document when connectivity to the certificate authority was unavailable, the first validation information being retrieved to validate the first digital signature;
adding a first piece of the retrieved first validation information to a dictionary separate from the content portion and included in the electronic document, the first piece being added based at least in part on a determination that a second piece of the retrieved first validation information corresponds to at least a pre-existing piece of second validation information that was already included in the dictionary before the connectivity was available; and
validating the applied first digital signature using an amalgamation of the added first piece and at least the pre-existing piece of validation information included in the dictionary when connectivity to the certificate authority is unavailable.

2. The non-transitory computer storage medium of claim 1, wherein the electronic document is associated with at least a second digital signature applied to the content portion, and wherein at least the pre-existing piece of validation information is employable to validate the applied second digital signature when connectivity to the certificate authority is unavailable.

3. The non-transitory computer storage medium of claim 1, wherein the added first piece is smaller than the retrieved first validation information.

4. The non-transitory computer storage medium of claim 1, wherein the dictionary is included in a storage portion of the electronic document and the storage portion is separate from the content portion.

5. The non-transitory computer storage medium of claim 1, wherein at least the pre-existing piece of validation information was retrieved from the certificate authority at a time when connectivity thereto was available, the time being prior to when the first piece of verification validation information is retrieved.

6. A computer-implemented method, comprising:
retrieving first validation information from a certificate authority when connectivity thereto is available, the first validation information being retrieved based on a first digital signature having been applied to a content portion of an electronic document when connectivity to the certificate authority was unavailable, the first validation information being retrieved to validate the first digital signature;
adding a first piece of the retrieved first validation information to a dictionary of the electronic document that is separate from the content portion, the first piece being added based at least in part on a determination that a second piece of the retrieved first validation information corresponds to at least a pre-existing piece of validation information already included in the dictionary before connectivity to the certificate authority became available; and
validating the applied first digital signature using an amalgamation of the added first piece and at least the pre-existing piece of validation information included in the dictionary when connectivity to the certificate authority is unavailable.

7. The computer-implemented method of claim 6, wherein the content portion of the electronic document is associated with a second digital signature applied to the content portion.

8. The computer-implemented method of claim 7, wherein at least the pre-existing piece of validation information is employable to validate the second digital signature when connectivity to the certificate authority is unavailable.

9. The computer-implemented method of claim 6, further comprising:
validating at least the applied first digital signature based at least in part on the added first piece and at least the pre-existing piece of validation information when connectivity to the certificate authority is unavailable.

10. A computerized system comprising:
one or more processors; and one or more non-transitory computer storage media storing computer-usable instructions that, when used by the one or more processors, cause the one or more processors to:
- retrieve, from a certificate authority when connectivity thereto is available, first validation information that is employable to validate a first digital signature of an electronic document, the first validation information being retrieved based on a first digital signature having been applied to a content portion of an electronic document when connectivity to the certificate authority was unavailable;
- add a first piece of the retrieved first validation information to a dictionary of the electronic document that is separate from the content portion, the first piece being added based at least in part on a determination that at least a pre-existing piece of validation information included in the dictionary corresponds to a second piece of the retrieved first validation information; and
- validate the applied first digital signature using an amalgamation of the added first piece and at least the pre-existing piece of validation information included in the dictionary when connectivity to the certificate authority is unavailable.

11. The computerized system of claim 10, wherein the electronic document is a signed electronic document having a second digital signature applied to the content portion, and wherein at least the pre-existing piece of validation information is employable to validate the applied second digital signature when connectivity to the certificate authority is unavailable.

12. The computerized system of claim 11, wherein the dictionary is adapted to store a plurality of pieces of validation information, and wherein the dictionary is employable to validate each of the first and second digital signatures applied to the content portion of the electronic document.

13. The computerized system of claim 10, wherein the instructions, when used by the one or more processors, further cause the one or more processors to:
- validate at least the applied first digital signature based at least in part on the added first piece and at least the pre-existing piece of validation information when connectivity to the certificate authority is unavailable.

* * * * *